US012025239B2

United States Patent
Feenstra et al.

(10) Patent No.: US 12,025,239 B2
(45) Date of Patent: Jul. 2, 2024

(54) DRY PIPE VALVE

(71) Applicants: Minimax Viking Research & Development GmbH, Bad Oldesloe (DE); VIKING GROUP, INC., Caledonia, MI (US)

(72) Inventors: Shawn J Feenstra, Caledonia, MI (US); Vinh Bao Hoa, Kentwood, MI (US); Martin H. Workman, Delton, MI (US)

(73) Assignees: Viking Group, Inc., Caledonia, MI (US); Minimax Viking Research & Development GmbH, Bad Oldesloe (DE)

( * ) Notice: Subject to any disclaimer, the term of this patent is extended or adjusted under 35 U.S.C. 154(b) by 0 days.

(21) Appl. No.: 18/243,794

(22) Filed: Sep. 8, 2023

(65) Prior Publication Data
US 2023/0417343 A1 Dec. 28, 2023

Related U.S. Application Data

(63) Continuation of application No. PCT/US2022/029866, filed on May 18, 2022.
(Continued)

(51) Int. Cl.
*F16K 35/02* (2006.01)
*A62C 35/62* (2006.01)
(Continued)

(52) U.S. Cl.
CPC ............ *F16K 35/025* (2013.01); *A62C 35/62* (2013.01); *A62C 35/68* (2013.01); *F16K 15/03* (2013.01)

(58) Field of Classification Search
CPC ...... F16K 35/025; F16K 35/022; F16K 15/03; A62C 35/62
(Continued)

(56) References Cited

U.S. PATENT DOCUMENTS 1,628,674 A * 5/1927 Lewis .................. A62C 35/645
169/22
1,869,204 A 7/1932 Lowe et al.
(Continued)

FOREIGN PATENT DOCUMENTS

GB 821290 10/1959
GB 877625 9/1961
(Continued)

OTHER PUBLICATIONS

International Searching Authority, International Search Report and Written Opinion in International Appln. No. PCT/2022/029866, Aug. 16, 2022, 16 pp.

*Primary Examiner* — Reinaldo Sanchez-Medina
*Assistant Examiner* — Nicole Gardner
(74) *Attorney, Agent, or Firm* — Perkins Coie LLP

(57) ABSTRACT

Differential-type dry pipe valves for fire protection systems are provided. The valve includes a body with a clapper assembly disposed in an internal passage of the valve body between an inlet and an outlet. The clapper assembly is movable between a closed position and an open position to respectively prevent and permit fluid flow through the passage from the inlet to the outlet. With the clapper assembly in the open position, an internal mechanism is positioned to stop the clapper moving to the closed position. The valve includes a resetting assembly having a knob exterior to the body. Translation of the knob toward the outlet moves the internal mechanism which permits the clapper assembly to move to the closed position.

36 Claims, 26 Drawing Sheets

Related U.S. Application Data

(60) Provisional application No. 63/190,042, filed on May 18, 2021, provisional application No. 63/190,018, filed on May 18, 2021, provisional application No. 63/189,987, filed on May 18, 2021, provisional application No. 63/190,000, filed on May 18, 2021, provisional application No. 63/294,327, filed on Dec. 28, 2021, provisional application No. 63/294,325, filed on Dec. 28, 2021, provisional application No. 63/294,332, filed on Dec. 28, 2021, provisional application No. 63/294,322, filed on Dec. 28, 2021.

(51) Int. Cl.
*A62C 35/68* (2006.01)
*F16K 15/03* (2006.01)

(58) Field of Classification Search
USPC ........................................................ 251/109
See application file for complete search history.

(56) References Cited

U.S. PATENT DOCUMENTS

| | | | |
|---|---|---|---|
| 3,307,633 | A | 3/1967 | Newall |
| 4,854,342 | A | 8/1989 | Polan |
| 7,322,423 | B2 | 1/2008 | Ringer |
| 7,673,695 | B2 * | 3/2010 | Deurloo .............. F16K 15/1821 169/17 |
| 8,851,195 | B2 | 10/2014 | Deurloo |
| 2004/0163824 | A1 | 8/2004 | Ringer |
| 2006/0260822 | A1 | 11/2006 | Cabral |
| 2017/0002938 | A1 | 1/2017 | Wortmann |
| 2018/0043198 | A1 | 2/2018 | Meyer et al. |

FOREIGN PATENT DOCUMENTS

| | | |
|---|---|---|
| GB | 103449 | 1/2017 |
| JP | H062251361 | 8/1994 |

* cited by examiner

DRY PIPE VALVE

PRIORITY DATA AND INCORPORATION BY REFERENCE

This application is a continuation of International Application PCT/US2022/029866, filed May 18, 2022, which claims the benefit of U.S. Provisional Application No. 63/189,987, filed May 18, 2021; U.S. Provisional Application No. 63/190,000, filed May 18, 2021; U.S. Provisional Application No. 63/190,018, filed May 18, 2021; U.S. Provisional Application No. 63/190,042, filed May 18, 2021; U.S. Provisional Application No. 63/294,322, filed Dec. 28, 2021; U.S. Provisional Application No. 63/294,325, filed Dec. 28, 2021; U.S. Provisional Application No. 63/294,327, filed Dec. 28, 2021; and U.S. Provisional Application No. 63/294,332, filed Dec. 28, 2021, each of which is incorporated by reference in its entirety.

TECHNICAL FIELD

The present disclosure generally relates to a dry pipe valve for use with automatic fire protection systems.

BACKGROUND

Fire protection systems installed in structures that may be exposed to freezing temperatures can incorporate a dry pipe automatic fire protection sprinkler system. These systems generally include a dry side (e.g., containing pressurized air, nitrogen, or any other suitable medium) sprinkler system connected through a dry pipe valve to a wet side source, such as a water main, to selectively provide water to the sprinkler system during a fire event. The dry pipe valve is positioned within a heated area of the structure to prevent freezing of the water. One type of dry pipe valve is the differential-type dry pipe valve which utilizes differential pressure across a movable clapper to occlude flow of the water from the wet side into the piping of the sprinkler system until a fire event.

Great Britain Patent No. GB 103,449 shows a differential-type dry pipe valve having a valve body that forms an internal passage extending along a longitudinal axis between an inlet and an outlet. The body also defines an access port in communication with the passage for accessing internal components of the valve. In the valve, a cover is positioned over the access port to seal the access port in a fluid tight manner Disposed internally within the passage, the valve includes a seat that is coupled to the body. The seat has a first water seating surface and a second air seating surface disposed on a common plane. The first seating surface has a first configuration disposed about a first seat axis aligned with the longitudinal axis. The second seating surface has a second configuration that cinctures the first seating surface and centered about a second seat axis offset to the longitudinal axis.

The valve in GB 103,449 includes an internal clapper assembly mounted on a pivot to cooperate with the seat between a closed and an open configuration. The clapper assembly has an impervious body with a first sealing surface and a second sealing surface and a knuckle that defines a pivot axis. The first sealing surface defines a first seal axis and the second sealing surface defines a second seal axis. In the closed position of the clapper assembly, the first sealing surface is contiguous to the first seating surface with the first seal axis aligned with the first seat axis; and the second sealing surface is contiguous to the second seating surface with the second seal axis aligned with the second seat axis to occlude fluid flow through the valve passage. In the open position, the first sealing surface is spaced from the first seating surface with the first seal axis oblique to the first seat axis and the second sealing surface is spaced from the second seating surface with the second seal axis oblique to the second seat axis to permit fluid flow through the passage. The valve of GB 103,449 also includes a latch that is disposed in the passage and mounted on a pivot. The latch contacts a tooth formation of the clapper assembly to hold the clapper assembly in an open position. To reset the valve with the clapper assembly in the closed position, the latch is manually accessed via the access port and pivoted out of the engaged contact with the clapper assembly allowing it to be reset to the closed position.

Other known differential-type dry pipe valves include a resetting assembly to interface with and move the stopper. For example, U.S. Pat. No. 7,322,423 shows and describes a resetting actuator assembly to rotate a pivoted stopper clear of an internal clapper assembly thereby permitting the clapper assembly to move from its stopped position to its closed position against the seat. The actuator assembly includes a knob affixed to one end of a rod that extends into the valve passage through an aperture formed in a protrusion of the valve body and supported therein. The knob is located externally above the protrusion with respect to the inlet so that it a can be depressed in the downward direction toward the inlet to overcome a biasing spring and bring the rod into contact with the stopper. Given the position and orientation of the resetting actuator assembly, the biasing spring is necessary to maintain the knob and rod in a normally upward direction and clear of the stopper thereby permitting the stopper to latch the clapper assembly in its stopped position. It is believed that the biasing element can be subject to external elements and prone to damage or wear, which can interfere with desired operation of the resetting assembly or the valve itself.

There remains a need for differential-type dry valves with a resetting assembly arrangement that can eliminate a need for a separate biasing component and can effectively externally reset the valve and return the fire protection system to operation.

SUMMARY

The present invention is directed to a dry pipe valve for use with fire protection systems such as dry pipe automatic fire protection sprinkler systems. The dry pipe valve includes a clapper assembly disposed in a passage of a body and movable between a closed position occluding fluid flow through the passage, and an open position permitting fluid flow through the passage. The dry pipe valve has an internal mechanism that engages the clapper assembly to prevent transitioning of the clapper assembly from the open position to the closed position until the mechanism is disengaged from the clapper assembly by a resetting actuator assembly. The mechanism includes a latch assembly and/or a stopper assembly and the actuator includes a knob exterior to the body with an opposite end that extends into the passage through an aperture formed in the valve body. Translation of the knob of the resetting actuator assembly causes the stopper assembly to disengage from the clapper and permit transition of the clapper assembly to the closed position thereby resetting the valve so that the fire protection system can be rearmed for a subsequent fire event. Preferred embodiments of the dry pipe valve arrange the resetting actuator assembly with the knob below the aperture with respect to the inlet. The knob is translatable in a direction from the inlet toward the outlet to interface the end of the actuator with the stopper and disengage the stopper from the clapper and permit the clapper to move to the closed position. The dry pipe valve can be operated with the resetting actuator assembly biased in a preferred initial or first position under the weight of the knob. After valve operation and in order to reset the valve, the actuator and/or the knob is preferably translated to a second position toward the outlet counter to the weight of the actuator and/or the knob to move the stopper and permit transition the clapper from the open position to the closed position.

One preferred embodiment of a dry pipe valve provides for a differential-type dry pipe valve that includes a body having a passage extending along a longitudinal axis between an inlet and an outlet, the body defining an access port, an aperture and a protrusion each communicating with the passage. A cover is positioned over the access port and a seat is coupled to the body. The seat has first and second seating surfaces disposed on the seat with the first seating surface having a first configuration disposed about a first seat axis aligned with the longitudinal axis and the second seating surface having a second configuration cincturing the first seating surface to define a second seat axis offset to the longitudinal axis. The first seating surface and the second seating surface are preferably generally disposed on a common plane. The valve includes a clapper assembly disposed in the passage proximate the seat and mounted via a first pivot in the passage. The clapper assembly has an impervious body with a first sealing surface and a second sealing surface and a knuckle that defines a pivot axis aligned along the first pivot and orthogonal to the longitudinal axis and preferably orthogonal to the access port. The first sealing surface defines a first seal axis and the second sealing surface defining a second seal axis. In a closed position of the clapper assembly, the first sealing surface is contiguous to the first seating surface with the first seal axis aligned with the first seat axis and the second sealing surface contiguous to the second seating surface with the second seal axis aligned with the second seat axis to occlude fluid flow through the passage. In an open position of the clapper assembly, the first sealing surface is spaced from the first seating surface with the first seal axis oblique to the first seat axis and the second sealing surface spaced from the second seating surface with the second seal axis oblique to the second seat axis to permit fluid flow through the passage in an open position.

The preferred differential-type dry pipe valve includes a stopper disposed in the passage and mounted on a second pivot. The stopper is in contact with the clapper assembly to define a stopped position of the clapper assembly between the open position and the closed position of the clapper assembly. A preferred resetting assembly embodied as a resetting knob assembly is provided to interface with and move the stopper and permit the clapper assembly to move from the stopped position to the closed position. The resetting knob assembly includes a rod having a first end and a second end with a knob affixed to the second end. The rod is disposed in the aperture of the valve body and supported by the body with the first end in the passage and the knob external to the body. In a preferred arrangement, the resetting knob assembly is positioned below the protrusion with respect to the inlet. In the stopped position of the clapper assembly, the knob is translatable from a first position to a second position in a direction from the inlet toward the outlet. In the first position, the first end of the rod is axially spaced from the stopper and in the second position, the first end of the rod interfaces and moves the stopper, permitting the clapper assembly to move from the stopped position to the closed position. Accordingly, preferred methods are provided for resetting a differential-type dry pipe valve having a body defining an internal passage extending along a longitudinal axis between an inlet and an outlet having a resettable internal clapper assembly for controlling the flow of fluid between the inlet and the outlet. A preferred method includes positioning a resetting knob assembly in a first position with respect to the inlet and the internal clapper assembly; and translating the resetting knob assembly to a second position toward the outlet.

Another preferred dry pipe valve includes a clapper assembly disposed in a passage of a body and movable between a closed position occluding fluid flow through the passage, and an open position permitting fluid flow through the passage. The dry pipe valve has an internal mechanism configured to prevent transitioning of the clapper assembly from the open position to the closed position until the mechanism is disengaged from the clapper assembly. The mechanism includes a latch assembly and/or a stopper assembly with an actuator having a knob exterior to the body and an end extending into the passage. Translation of the knob causes the mechanism to disengage from the clapper assembly and permit transition of the clapper assembly to the closed position so that the fire protection system can be rearmed for a subsequent fire event. The dry pipe valve can be operated by positioning the knob in a first position based on the weight of the knob and translating the knob to a second position counter to the weight of the knob to transition the clapper from the open position to the closed position.

Preferred embodiments of the dry pipe valve provide that the knob is translatable along a longitudinal axis of the body and has a first position that is based on the weight of the knob when the latch/stopper assembly is in an engaged position with respect to the clapper assembly, and a second position that is counter to the weight of the knob when the latch/stopper assembly is in a disengaged position with respect to the clapper assembly. Configurations of the preferred embodiments allow the latch/stopper assembly to maintain the engaged position with respect to the clapper by the force of gravity. Translation of the knob from the first position to the second position is in a direction generally toward the outlet of the dry pipe valve (e.g., upward counter to the force of gravity). Once the latch/stopper assembly engages the clapper assembly, the dry pipe valve must be reset by translating the knob from the first position to the second position, allowing the clapper to close and the differential pressures to be applied to the dry pipe valve. Releasing force on the knob in the second position allows gravity to translate the knob back to the first position for engagement with the clapper without the need for a spring or biasing element.

The latch/stopper assembly can further include a lever, a stopper, or a similar structure in the passage that pivots about a pin at a position away from a portion of the stopper that engages the clapper. The dry pipe valve is operated by engaging the clapper with the stopper positioned in the engaged position to prevent pivoting the clapper from the open position to the closed position, and moving the engaging end portion and the central portion of the stopper toward the outlet about a fixed axis in the fixed end portion such that the stopper transitions to the disengaged position to permit movement of the clapper to the closed position.

The actuator interfaces with the lever/stopper between the pinned position and the portion of the stopper that engages the clapper (e.g. an engaging end of the lever), where translation of the actuator causes the lever/stopper to rotate from an engaged position, preventing movement of the clapper assembly from the open position to the closed position, to a disengaged position, permitting movement of the clapper assembly from the open position to the closed position, and more particularly, from a stopped position to the closed position. Moving the lever/stopper from the engaged position to the disengaged position includes pivoting the lever/stopper about the pin such that the engaging end of the lever/stopper and the portion of the lever/stopper that the actuator interfaces generally moves in a direction toward the outlet. In other embodiments, the latch/stopper assembly is positioned on a lateral side of the clapper, which can allow the latch/stopper assembly to keep the clapper open wider during drainback of the dry pipe valve.

The clapper assembly interfaces with a seat disposed in the passage of the body to prevent fluid communication between the dry and wet sides of the dry pipe valve. The seat includes a dry seating surface and a wet seating surface to interface with a dry side seal and a wet side seal, respectively, of the clapper assembly. Dry pipe valves of the present disclosure can have a dry seating surface with a different configuration (e.g., a different shape) from a wet seating surface. In this regard, the shapes of seating surfaces are not both the same geometric configuration, for example, both circular, oval, rectangular, triangular, other polygons, or any other closed form geometry.

In some embodiments, the dry seating surface can have a rounded-rectangular configuration and the wet seating surface can have a circular configuration. In this configuration, the positioning of the seating surfaces with respect to each other are such that the circular wet seating surface is within the boundary of the rounded-rectangular dry seating surface (i.e., the dry seating surface cinctures the wet seating surface) and is positioned closer to three of the four linear sides of the rounded-rectangle than the fourth linear side of the rounded-rectangle. The differential can be created within the dry pipe valve by locating a first effective area of the clapper within the body, the first effective area having at least four linear portions, and locating a second effective area of the clapper within the first effective area and generally equidistant from at least three of the linear portions. The distances from the linear sides of the rounded-rectangle can be any suitable distance (e.g., offset toward one linear side in the direction of both major and minor widths of the rounded-rectangle, centered across the minor width, or equidistant from three of the four linear sides). In some embodiments, the wet seating surface is generally centered across the minor length of the rounded-rectangle (i.e., equidistant from the longer two linear sides of the rounded-rectangle), while being positioned closer to the shorter linear side of the rounded-rectangle adjacent to the pivot of the clapper assembly. In another embodiment, the wet seating surface is generally equidistant from three of the four linear sides of the rounded-rectangle, with the wet seating surface positioned closer to the pivot of the clapper assembly than the end of the clapper opposite the pivot.

The configurations of the dry and wet seats described herein provide a relatively larger surface area with respect to the overall width and length of the clapper assembly. In one example, a circle or an oval is longer and wider than a rounded-rectangle with the same surface area, which allows for a reduced profile of the interior of the valve given the same clearances from the clapper assembly. The present disclosure minimizes the interior footprint of the dry pipe valve given the same clearance of the interior walls of the housing/body from the clapper (e.g., ¾" from any moving part to a stationary wall), while maximizing the effective area of the clapper assembly. The present disclosure reduces the footprint of the dry pipe valve (in width and depth) by minimizing the clapper width in the direction of the pivot of the clapper assembly and the direction normal to the pivot along the clapper assembly for clearances in the housing/body. Minimizing these dimensions gives more clearance in the critical directions for dry pipe valve installations, where space in the height direction is often more readily available than width or depth.

The body of the dry pipe valve includes a selectively covered access port to allow access to the passage, e.g., to service the clapper assembly. During servicing of the clapper assembly, the clapper assembly may need to be removed from the passage and subsequently reinstalled in the passage. In this regard, the access port has a geometric shape that increases the access to the clapper assembly. The clapper is located in the dry pipe valve by providing a rounded-sector lateral profile of the body with a volume underneath the clapper in the second position, and defining an access opening area to lateral profile area ratio between about 20% and 65%. Some geometric configurations with non-parallel sides configure the access port more advantageously for removal and installation of the clapper assembly, and minimize the corresponding size of the housing/body of the dry pipe valve. In this regard, the longest dimension of the geometry of the access port is longer than the assembled length of the clapper assembly. The access port can include curvilinear sides instead of linear sides for increased surface area. In some embodiments, the access port has a rounded-sector perimeter with an arc that defines a chord length that is greater than an assembly length of the clapper assembly. The rounded-sector has two linear portions preferably aligned with the open and closed positions of the clapper assembly. The longest dimension of the access port can be oblique to the horizontal plane.

BRIEF DESCRIPTION OF THE DRAWINGS

Many aspects of the preferred embodiments can be better understood with reference to the following drawings. The components in the drawings are not necessarily drawn to scale. Instead, emphasis is placed on illustrating clearly the principles of the present disclosure. Furthermore, components can be shown as transparent in certain views for clarity of illustration only and not to indicate that the component is necessarily transparent. Components may also be shown schematically.

DETAILED DESCRIPTION

Figure 1:
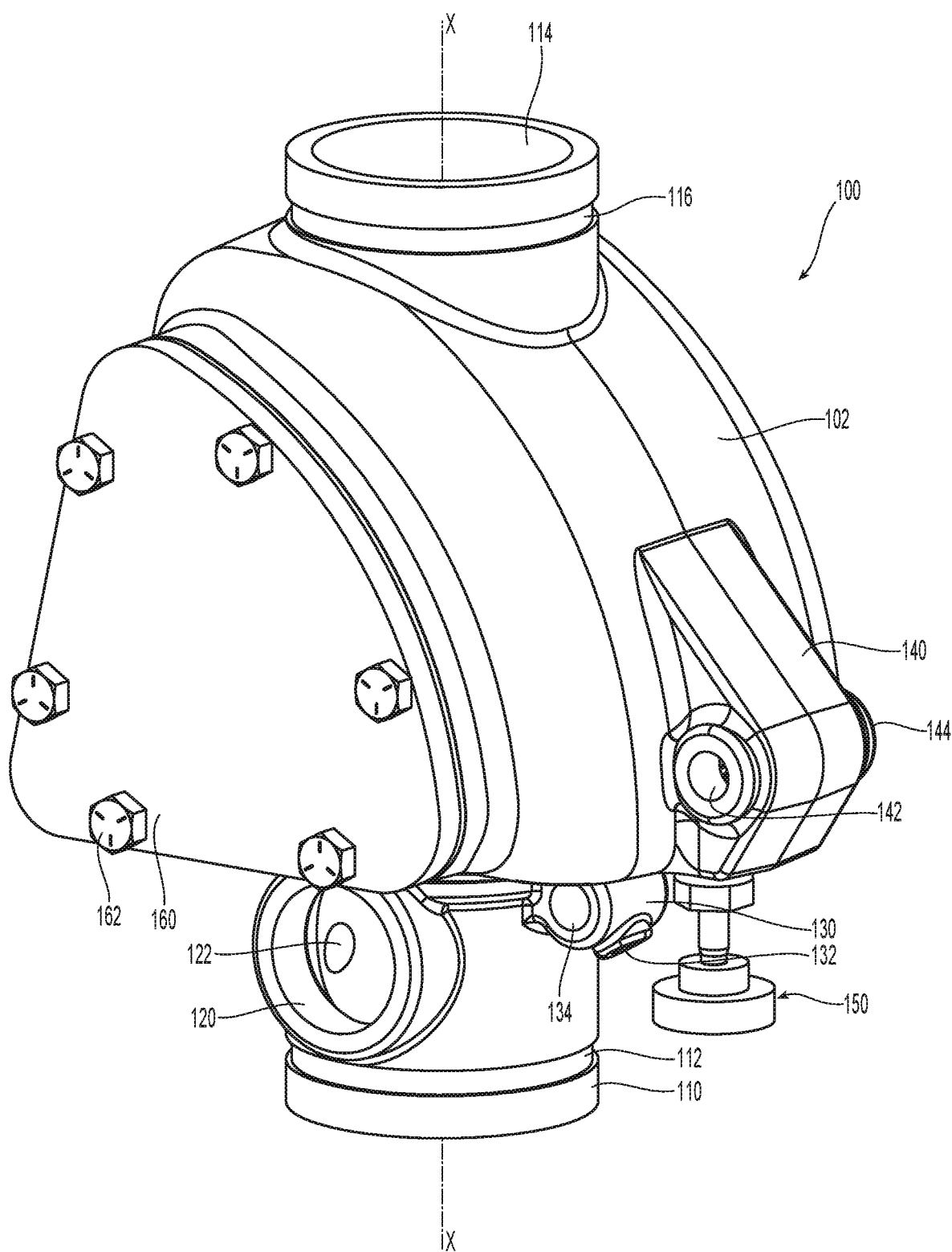
FIGS. 1-4 are perspective, top plan, rear elevation, and front elevation views, respectively, showing a differential-type dry pipe valve configured in accordance with a preferred embodiment.
Figure 2:
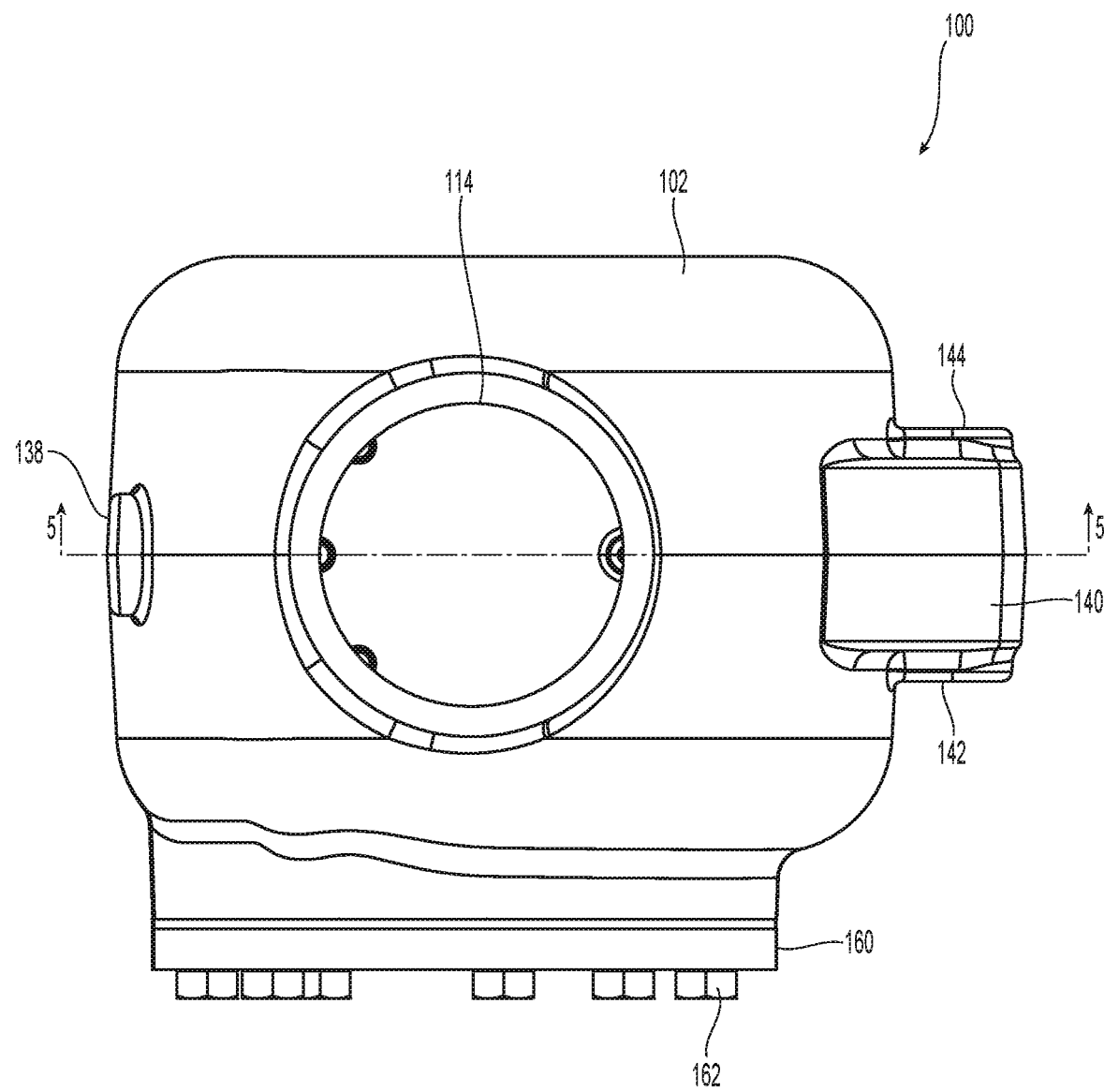
Figure 3:
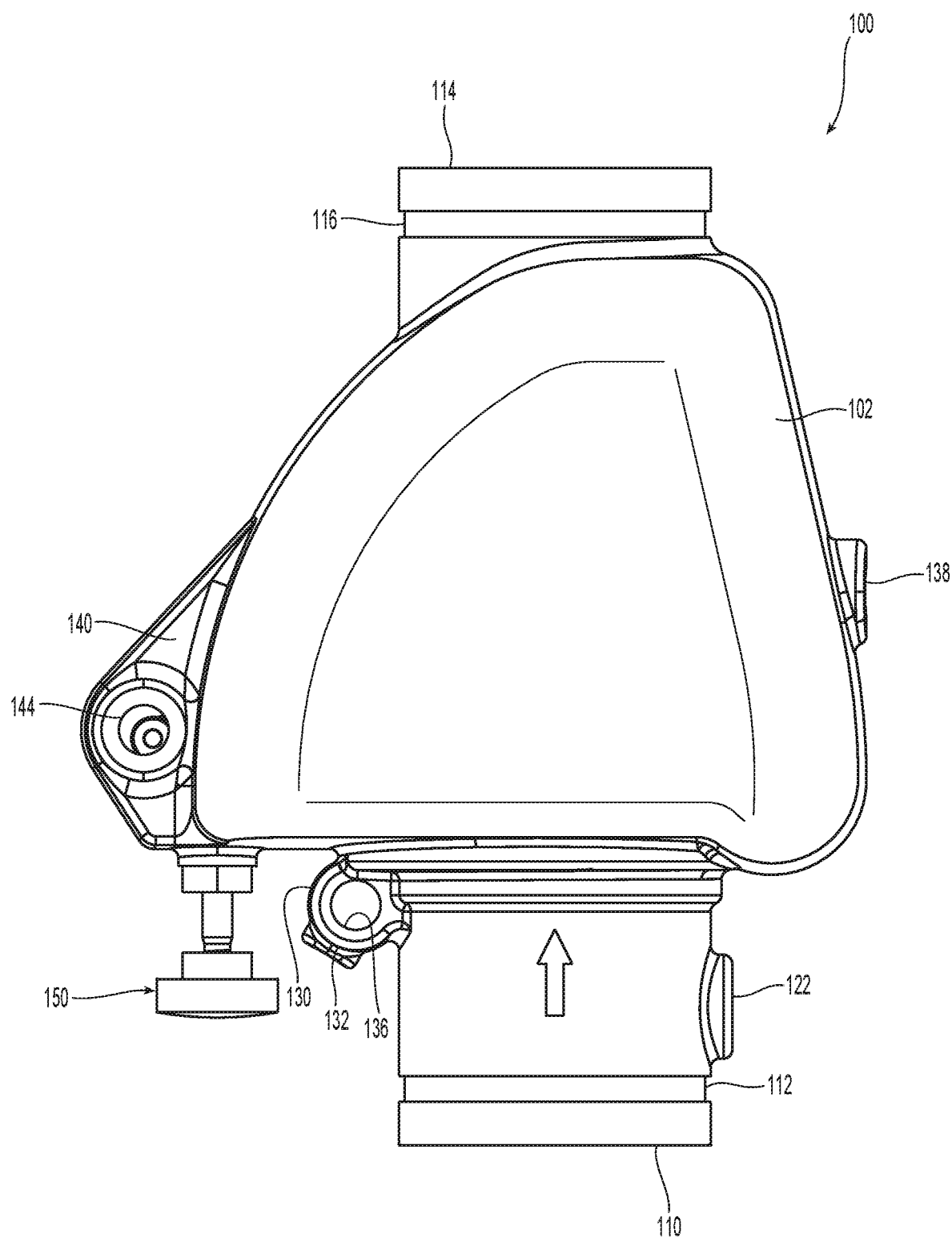

The terminology used in the description presented below is intended to be interpreted in its broadest reasonable manner, even though it is being used in conjunction with a detailed description of certain specific embodiments. Certain terms may even be emphasized below; however, any terminology intended to be interpreted in any restricted manner will be overtly and specifically defined as such in this Detailed Description section. Additionally, described embodiments can include other embodiments that are within the scope of the claims but are not described in detail with respect to the Figures.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features or characteristics may be combined in any suitable manner in one or more embodiments.

FIGS. 1-4 show perspective, top plan, rear elevation, and front elevation views, respectively, of a differential-type dry pipe valve 100. The valve 100 is suitable for use with dry pipe automatic fire protection sprinkler systems having a dry side sprinkler system connected through a dry pipe valve to a wet side source, such as a water main, to selectively provide water to the sprinkler system during a fire event. Reference throughout this specification to "dry side" describes the portions of the valve configured to hold pressurized gas (e.g., air, nitrogen, or other suitable pressurized gas), and reference to "wet side" describes the portions of the valve configured to occlude the flow of fluid from a source through the valve 100 (e.g., water, fire-extinguishing liquid, or any other firefighting medium). In the ensuing description, references are made to various components of a fully-trimmed fire protection system; however, such components are not shown in the figures for clarity in the views of the valve 100. The valve 100 of the present disclosure may be installed in any conventional dry pipe fire protection system using any suitable combination of pipes, lines, fittings, gauges, seals, or fire protection system components.

The valve 100 includes a body 102 having an internal passage 166 (see Figure extending along a longitudinal axis X-X between an inlet 110 and an outlet 114 of the body 102. The inlet 110 is positioned on a wet side of the valve 100 and is configured to receive water or another suitable firefighting fluid from a pressurized source, e.g. a water main, a liquid supply, or a holding tank. In a preferred system installation, the valve 100 is installed with the longitudinal axis generally perpendicular to the ground plane such that the inlet 110 is closer to the ground plane than the outlet 114. The inlet 110 includes a retention groove 112 or other retention feature (e.g., a flange) to removably couple the liquid source line to the valve 100. The inlet 110 can further include a drain port 120 configured to couple to a main drain valve for manually draining liquid from the fire protection system and bleeding any air from the underground piping, and a pressure port 122 configured to couple to a supply pressure gauge for determining the supply pressure on the wet side of the system, and can also be trimmed to an alarm test valve. The outlet 114 is positioned on a dry side of the valve 100 and is configured to direct the flow of liquid to the sprinkler network when the valve 100 is opened. The outlet 114 can include a retention groove 116 or other retention feature (e.g., a flange) to removably couple the dry side of the system to the valve 100. In the illustrated embodiment, the inlet 110 and outlet 114 are axially aligned along the longitudinal axis; however, in other embodiments the inlet 110 and outlet 114 has axes that are laterally offset or disposed at an angle from each other.

The body 102 of the valve 100 can include a dry side charging port 138 extending through the body 102 into the passage 166 for supplying the dry side of the valve 100 with compressed gas (e.g., air, nitrogen, or other suitable gas) to charge a plurality of unactuated sprinklers of the fire protection system and apply the dry side pressure to the valve 100. The body 102 may further include a low-body drain protrusion 130 having a first lateral port 134, a second lateral port 136, and an axial port 132. The low-body drain protrusion 130 can be configured for draining the dry side of the passage 166 completely with the valve 100 closed (e.g., from the first or second lateral ports 134 or 136) and can be associated with a velocity check valve to stop flow through the low-body drain protrusion 130 during a fire event (e.g., to prevent loss of fluid to the dry side of the system). The low-body drain protrusion may also be used to check for seat leakage, and the axial port 132 can be plugged or used for other purposes in the fire protection system. During use, fluid enters the low-body drain protrusion and may flow to a pressure switch to indicate the valve 100 has opened and fluid is in the dry pipe system. A check valve can be used to prevent fluid from the alarm test valve line flowing into the chamber.

The body 102 of the valve 100 can include a dry side protrusion 140 having a third lateral port 142 and a fourth lateral port 144 for coupling various components. For example, the third lateral port 142 can be configured for coupling to an anti-columning device that prevents fluid from columning downstream of the valve 100. The fourth lateral port 144 can be configured for coupling to a gas pressure gauge for determining the gas pressure on the dry side of the system, coupling to an accelerator device for increasing the operating speed of the valve 100, provide liquid supply to a local sprinkler during a fire event, or any other system function requiring the gas pressure measurement. The orientation of the third and fourth lateral ports 142 and 144 allows trimming the valve 100 with the various components in directions that minimize the overall width of the fully-trimmed valve 100 in a direction perpendicular to the longitudinal axis X-X from the dry side charging port 138 to the dry side protrusion 140, which can be advantageous in space-limited installations. In other embodiments, the third and fourth lateral ports 142 and 144 can be used for any suitable trim component requiring communication with the dry side of the valve 100, or the gas pressure gauge and the anti-columning device can be collocated on the same lateral port (e.g., the third lateral port 142, the fourth lateral port 144, etc.). The third and fourth lateral ports 142 and 144 are configured to provide a shorter overall width of a fully trimmed valve 100 compared to valves of the current technology (i.e., the width direction in the orientation of FIG. 4). As will be explained in greater detail below with reference to FIGS. 5A-5D, the third and fourth lateral ports 142 and 144 may also provide access to components of a resetting knob assembly 150 during assembly and servicing of the valve 100. As used herein, "above" and "below" is with respect to the inlet 110 of the valve 100. Thus, for example, where the dry side protrusion 140 is above the inlet 110 and the resetting knob assembly 150 is axially between the dry side protrusion 140 and the inlet 110, the resetting knob assembly 150 is below the dry side protrusion 140.

The body 102 of the valve 100 includes an access port 164 (see FIGS. 11A-11C) extending into the passage 166 and a corresponding removable cover 160 coupled to the body 102 with fasteners 162 for selectively sealing the passage 166, confining the gas and/or fluid within the valve 100 during use of the fire protection system. As will be explained in greater detail below with reference to FIGS. 11A-11C, the access port can be configured to allow access for removal, installation, and servicing of components of the valve 100.

Figure 5A:
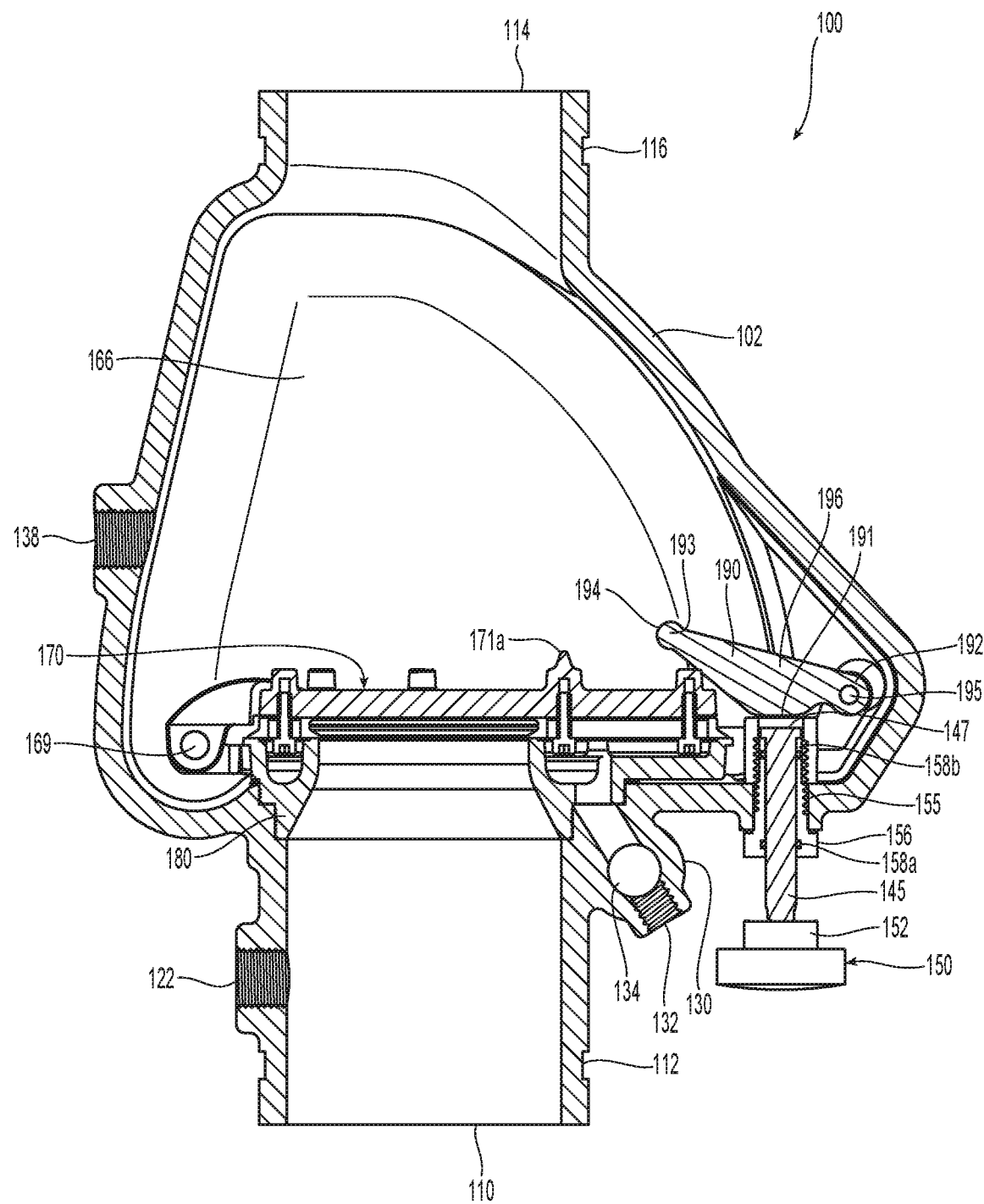
FIGS. 5A-5H are cross-sectional front elevation views of the valve of FIGS. 1-4 showing various positions of a clapper assembly positioned within a passage, with FIGS. 5A-5D showing a first embodiment of an actuator and FIGS. 5E-5H showing a second embodiment of an actuator.
Figure 5B:
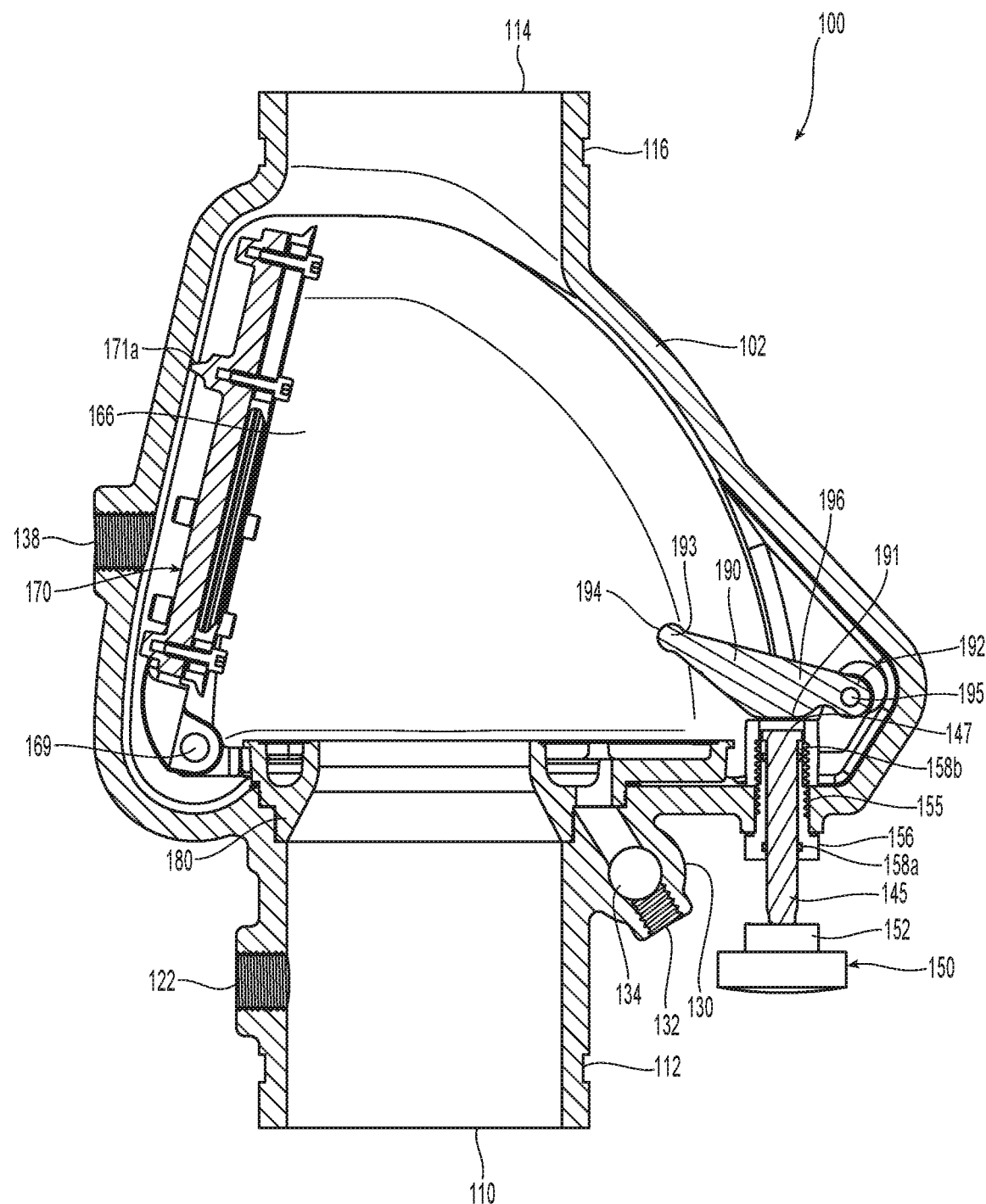
Figure 5C:
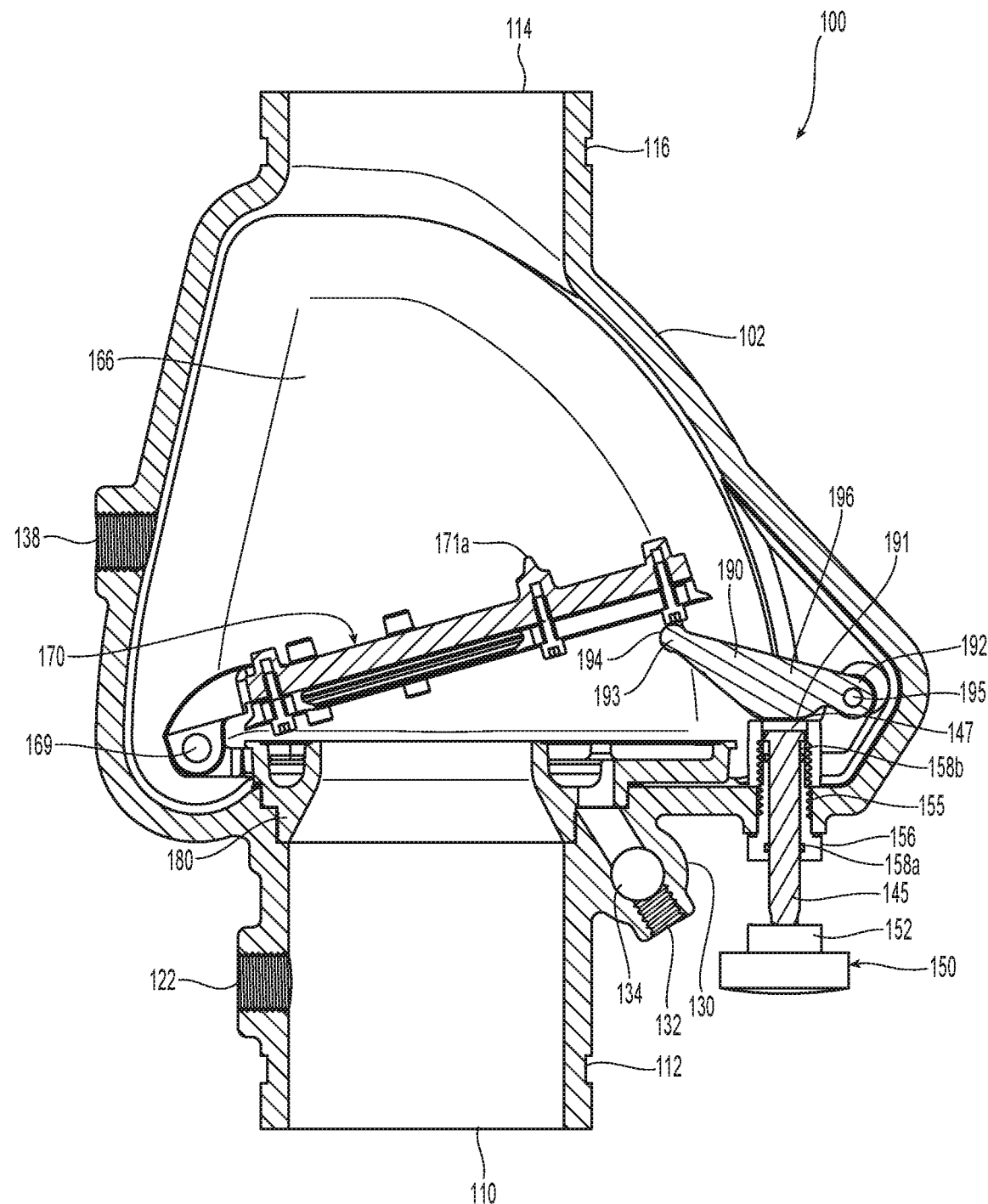
Figure 5D:
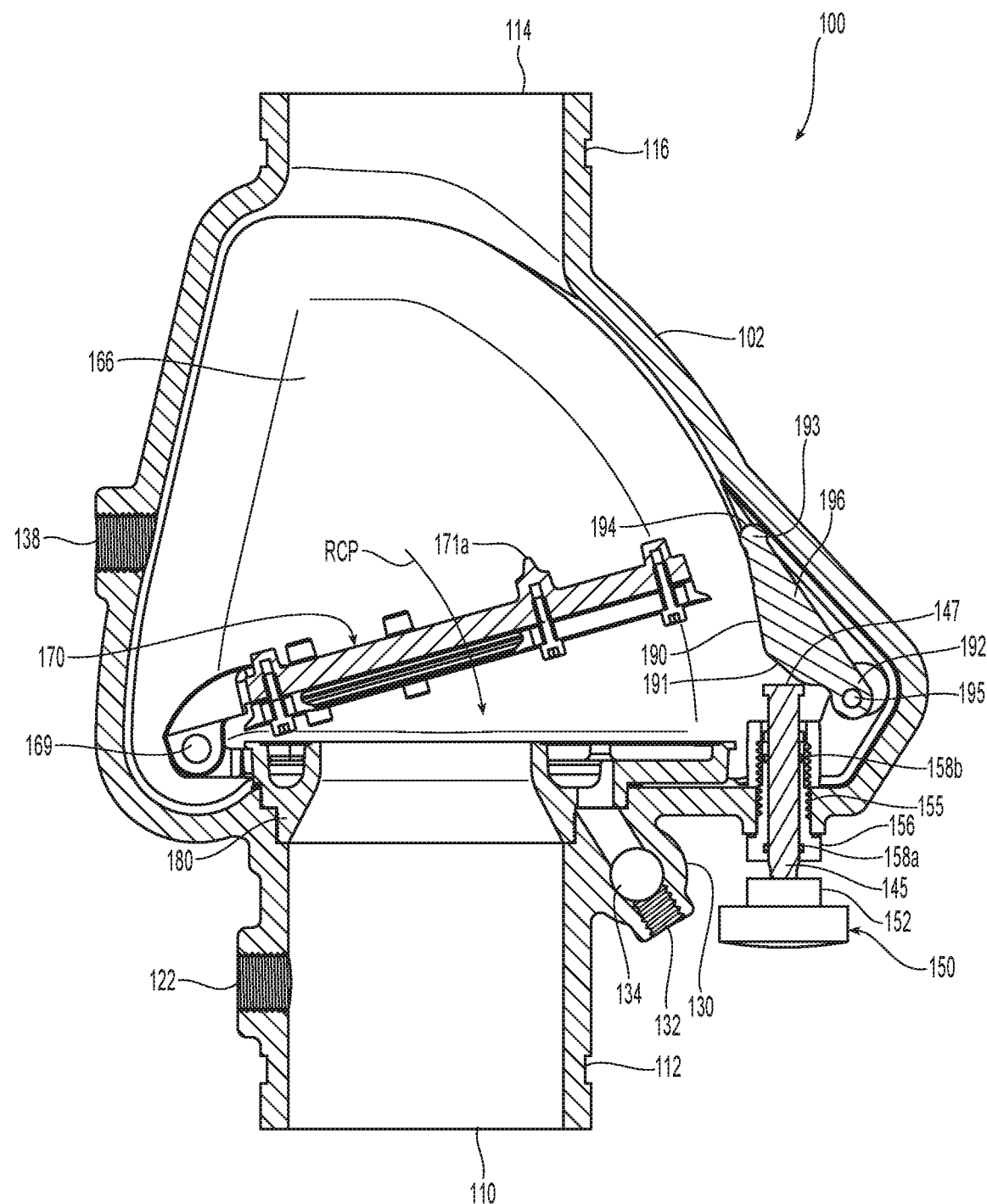
Figure 5E:
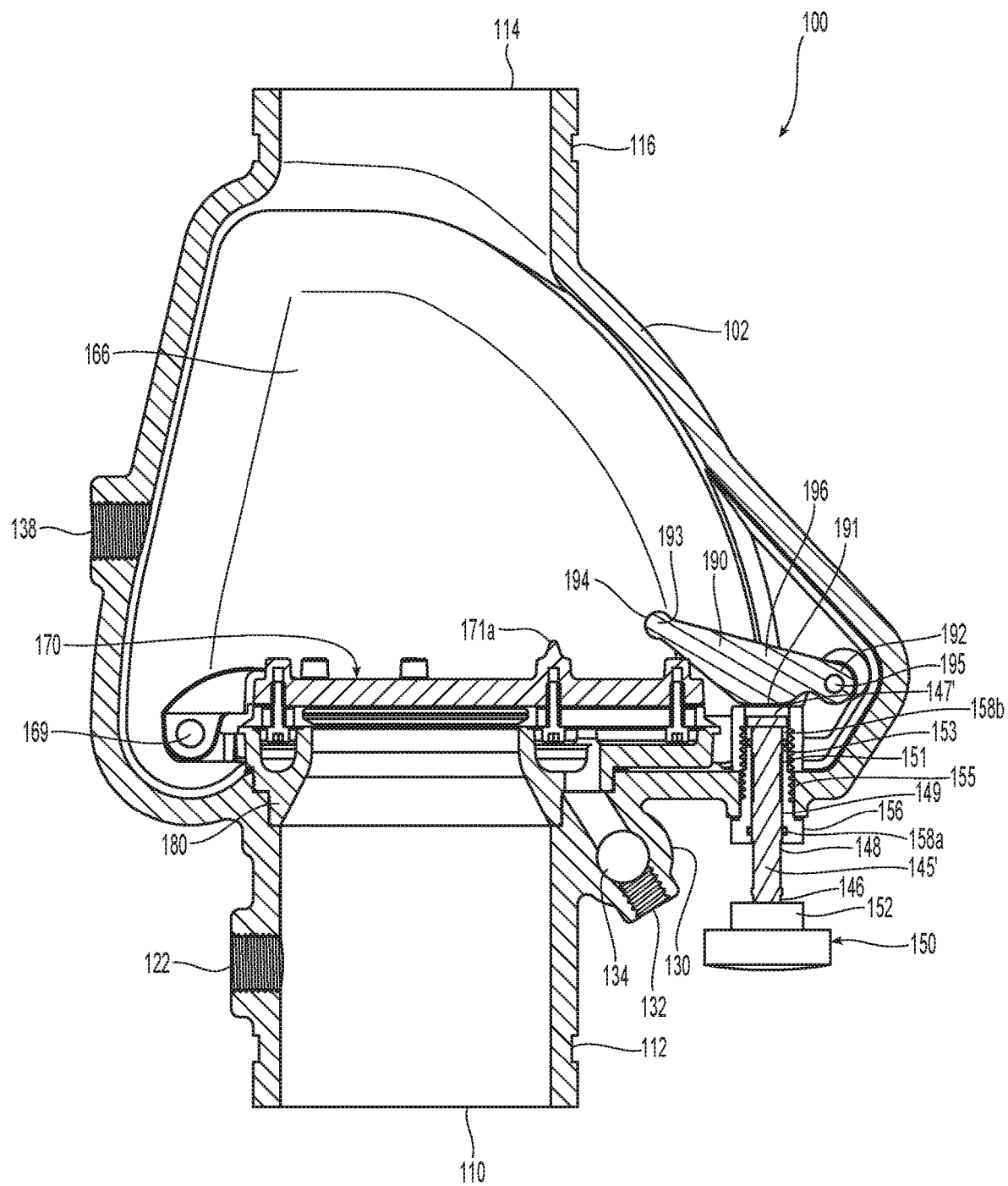
Figure 5F:
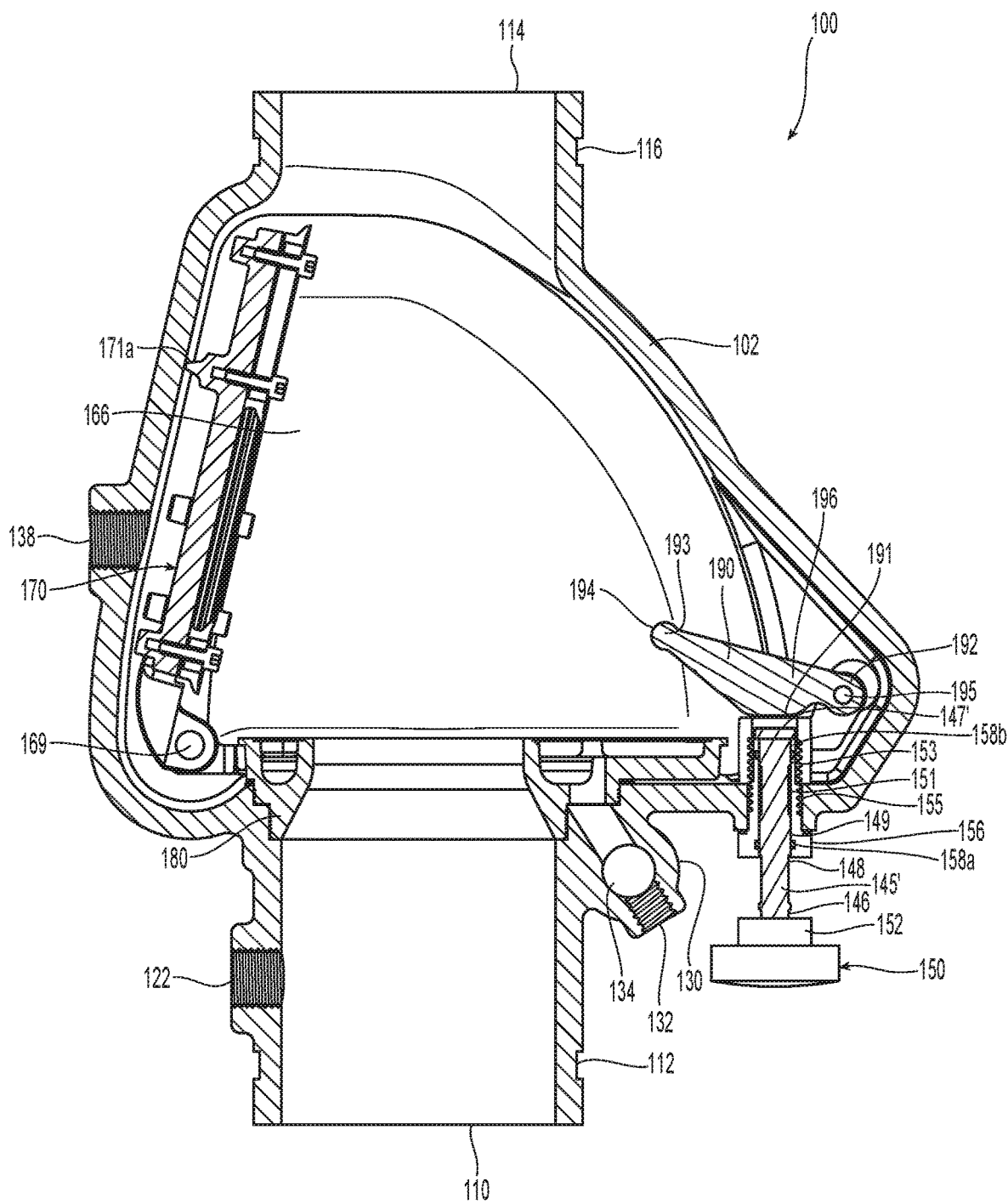
Figure 5G:
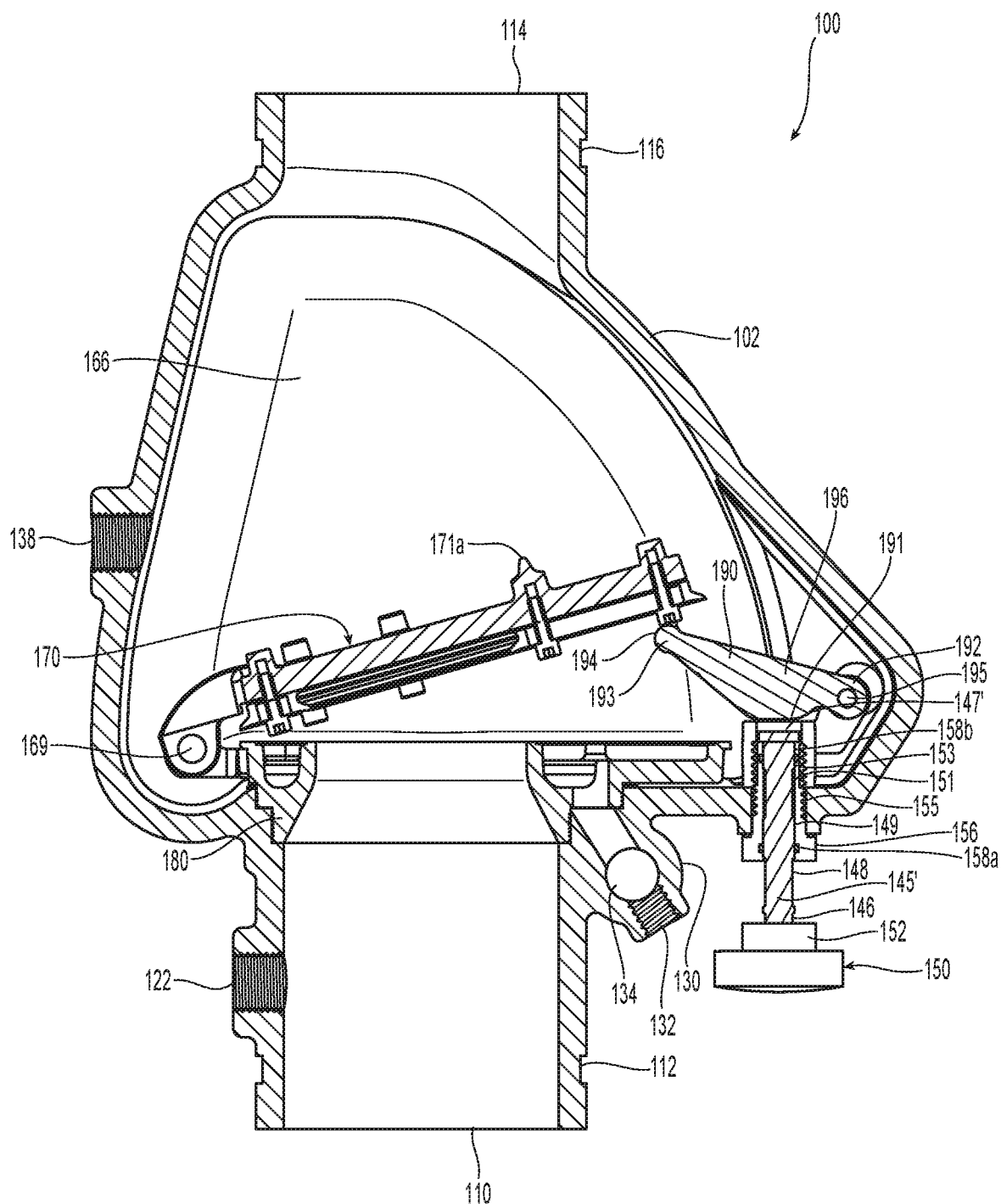
Figure 5H:
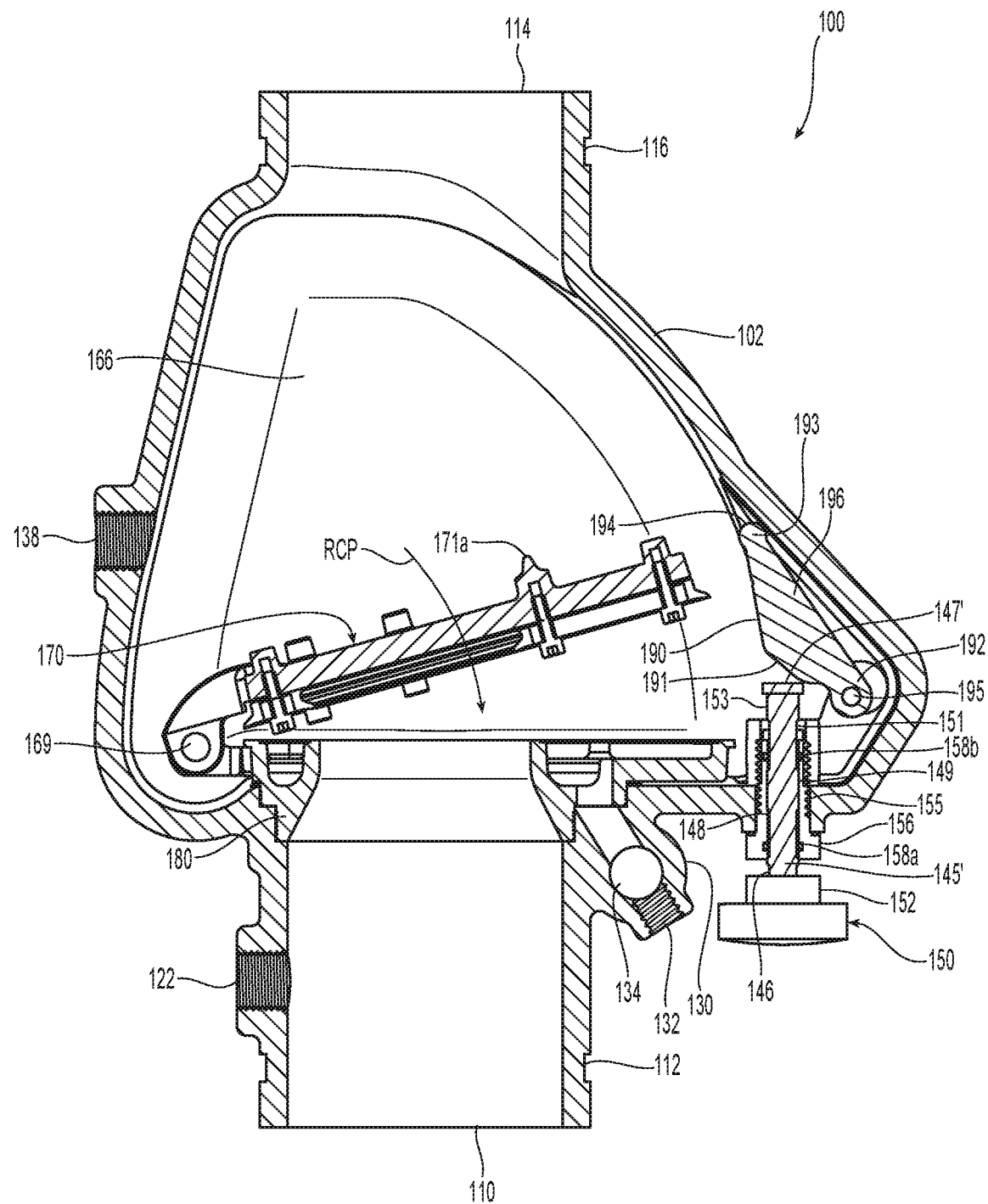

FIGS. 5A-5H show cross-sectional front elevation views of the valve 100 depicting various positions of a clapper assembly 170 pivotably mounted within the passage 166, including a closed position (FIGS. 5A and 5E), an open position (FIGS. 5B and 5F), a stopped position (FIGS. 5C and 5G), and a reset position (FIGS. 5D and 5H). In Figures the cross-section is taken along the line 5-5 shown in FIG. 2. Referring initially to FIG. 5A, the clapper assembly 170 is shown in the closed position (a first operative position), mounted proximate to and interfacing with a seat 180 disposed in the passage 166 of the body 102 to prevent fluid communication between the dry and wet sides of the valve 100. In this configuration, the valve 100 can generally be charged or "armed" having a gas pressure applied to the dry side of the clapper assembly 170 and a water pressure applied to the wet side of the clapper assembly 170.

In FIG. 5B, the clapper assembly 170 is shown in an open position (a second operative position) permitting fluid communication between the dry and wet sides of the valve 100, e.g., during a fire event where the pressure differential changes (e.g., the dry side gas pressure drops, the wet side fluid pressure rises, etc.) and the clapper assembly 170 opens such that fluid flows to the dry side sprinkler network. In FIG. 5C, the clapper assembly 170 is shown in a stopped position where movement of the clapper assembly 170 to the closed position is prevented by a stopper 190 supported by the body 102 and continuing to permit fluid communication between the dry and wet sides of the valve 100. The stopped position shown in FIG. 5C may be reached when pressure differentials exist during flow of water through the valve 100 during the fire event, which would tend to close the clapper assembly 170 while water flow is still desired. In FIG. 5D, the clapper assembly 170 is shown in a reset position by disengaging the stopper 190 from the clapper assembly 170. The components of the clapper assembly 170 will be explained in greater detail below with reference to FIGS. 7A-9D.

The stopper 190 is movable about a fixed axis by translation of the resetting knob assembly 150 having a knob 152 exterior to the body 102 and coupled to an actuator 145 (e.g., by a threaded coupling) that is supported by the body 102. The actuator 145 has a rod portion with an end 147 extending through an aperture 155 of the body 102 and into the passage 166 to interface with the stopper 190, where the aperture 155 can include a separate wear component, such as an actuator insert 156 with sealing members 158a and 158b to prevent leakage of gas or fluid past the actuator 145. In the illustrated embodiment, the knob 152 is generally translatable along the longitudinal axis between the inlet 110 and the outlet 114 of the body 102. In this regard, the knob 152 generally translates vertically when the valve 100 is installed in the fire protection system; however, the knob 152 can translate at any suitable angle from vertical.

The stopper 190 has a first end portion 192, a second end portion 193, and a central portion 196 positioned between the first end portion 192 and the second end portion 193. The first end portion 192, the second end portion 193, and the central portion 196 may each comprise about a third of the length of the stopper 190, may each have different lengths, or may have any other suitable configuration. In some embodiments, the central portion 196 is between about a third and half of the length of the stopper 190 or may be greater than half the length of the stopper 190. In other embodiments, the first end portion 192 is between about a third and half of the length of the stopper 190. The stopper 190 is movable about the fixed axis by pivoting about a stopper pin 195 disposed within the first end portion 192, where the pin 195 can be installed and serviced by access through the access port 164 and/or the third and fourth lateral ports 142 and 144. Accordingly, in a preferred embodiment, the stopper pivot axis is aligned with the third and fourth lateral ports 142 and 144 orthogonal to the longitudinal axis of the body 102. The stopper 190 rotates about the fixed axis between an engaged position where the stopper 190 is configured to prevent movement of the clapper assembly 170 about a fixed clapper axis from the open position to the closed position, and a disengaged position where the stopper 190 is configured to permit movement of the clapper assembly 170 to the closed position. In the position shown in FIG. 5A, the clapper assembly 170 is closed to occlude fluid communication between the wet and dry sides of the valve 100, and the stopper 190 is in the engaged position. In this configuration, the stopper 190 is maintained in the engaged position by the force of gravity acting on the stopper 190, which tends to keep the stopper 190 in contact with the actuator 145 aperture and/or insert 156.

As the clapper assembly 170 moves to the open position during opening of the valve 100, the stopper 190 rotates toward the disengaged position, allowing the clapper assembly 170 to transition to the open position, and then the stopper 190 rotates back to the engaged position as shown in FIG. 5B by the force of gravity acting on the stopper 190. The stopper 190 generally maintains the engaged position of FIG. 5B throughout the opening of the clapper assembly 170 in the valve 100, e.g., during a fire event. The clapper assembly 170 can further include a stop protrusion 171a that is configured to interface with the body 102 of the valve in the open position to ensure movement of the clapper assembly 170 toward the closed position (e.g., without binding against the body 102) and prevent damage to the body 102 and/or the clapper assembly 170 during use of the valve 100 (e.g., to prevent warping of the clapper assembly 170).

As noted above, during the use of the valve 100, a pressure differential may exist during flow of fluid through the valve 100, such as a brief interruption of the fluid supply, air pockets, or other events which would tend to close the clapper assembly 170 while fluid flow is still desired. Once the clapper assembly 170 closes during use, the dry side may have fluid pressure that prevents the clapper assembly 170 from reopening. As shown in FIG. 5C, to ensure uninterrupted fluid flow during such pressure differentials, a terminal end 194 at the second end portion 193 of the stopper 190 engages the clapper assembly 170 to prevent movement of the clapper assembly 170 to the closed position. During use, the clapper assembly 170 may oscillate to any point between the positions shown in FIGS. 5B and 5C during various differential pressure states, but the fluid flow through the valve 100 will remain substantially uninterrupted.

When the fire event concludes and the fluid supply is turned off, the clapper assembly 170 must be returned (reset) to the closed position for reuse of the valve 100 (e.g., the position shown in FIG. 5A). From the position in FIG. 5C, the valve 100 can be reset by rotating the stopper 190 from the engaged position (FIG. 5C) to the disengaged position (FIG. 5D) and permitting the clapper assembly 170 to return to the closed position. The stopper 190 is rotated to the disengaged position by translating the knob 152 generally along the longitudinal axis from an initial first position, as illustratively shown in FIG. 5C, toward the outlet 114 to a second position as shown in FIG. 5D. In the preferred first position of the knob 152 and the knob resetting assembly 150, the first end of the rod is axially spaced from the stopper 190 in its engaged position; and in the second position of the knob 152 and the knob resetting assembly 150, the first end of the rod interfaces and moves the stopper to the disengaged position. As the stopper 190 rotates about the fixed axis between the engaged and disengaged positions, the second end portion 193 of the stopper 190 rotates out of engagement with the clapper assembly 170, permitting return of the clapper assembly 170 to the closed position (e.g., in the return to closed position direction RCP) by the force of gravity acting on the clapper assembly 170. During rotation of the stopper 190, the second end portion 193 and the central portion 196 swing about the fixed axis (the pin 195).

The actuator 145 of the resetting knob assembly 150 is preferably supported within the aperture 155 such that the release of the translating force acting on the knob 152 and/or the actuator 145 permits the actuator 145 and the knob 152 to return from the second position to its first position under its own weight. With the knob 152 and actuator 145 in the first position, the stopper 190 is returned to its preferred engaged position, as shown in Figure and the valve 100 is armed and ready for a fire event. Thus, for preferred embodiments of the valve 100, the resetting assembly 150 and its knob 152 are gravity-biased into its initial first position against the supporting valve body structure, under its own weight acting in the direction of gravity and acting only against frictional forces. Friction of the sealing members 158a and 158b on the actuator 145 can be overcome by using lubricant to ensure gravity acting on the knob 152 and/or the actuator 145 returns the knob 152 to the first position after resetting.

Because the preferred arrangement of the resetting knob assembly 150 provides that the knob 152 and actuator 145 are gravity-biased, such that an additional biasing member (e.g. a spring) is not required to maintain the knob 152 in the first position; and therefore, the resetting knob assembly 150 is preferably supported within the aperture 155 in a "springless" manner. This preferred arrangement provides for an assembly that can eliminate the need for a biasing component that may otherwise interfere with the knob 152, actuator 145 and stopper 190 returning to their initial or reset positions. However, alternate arrangements of the preferred gravity-biased resetting knob assembly can include an additional biasing member such as, for example, a spring disposed about the actuator 145 to bias the knob 152 to its first position with respect to the body 102. In this regard, air pressure on the dry side of the valve 100 acts on the actuator 145 and the knob 152 and contributes to maintaining the knob 152 in the first position.

The stopper 190 can comprise any suitable shape to engage the clapper assembly 170 and prevent unintended closure of the valve 100. The stopper 190 includes the terminal end 194 at the second end portion 193 for engaging the clapper assembly 170, where the terminal end 194 can have various suitable shapes for engaging the clapper assembly 170, permitting rotation of the stopper 190 to the disengaged position, distribution of impact force by the clapper assembly 170, minimizing wear on the stopper 190, manufacturing considerations, etc. In the illustrated embodiment, the terminal end 194 of the stopper 190 has a cylindrical configuration with the axis of the cylinder generally aligned with the fixed axis of the pin 195 of the stopper 190. In this regard, the rounded portion of the cylinder of the terminal end 194 ensures that the stopper 190 will readily rotate to the disengaged position by translation of the knob 152, i.e., by slipping along surfaces of the clapper assembly 170 until the terminal end 194 is disengaged from the clapper assembly 170. In other embodiments, the terminal end 194 of the stopper 190 has any suitable configuration, e.g., rounded, polygonal, arcuate, etc., and/or may comprise an insert piece or other attached portion to reduce wear on the stopper 190 (e.g., polymeric, hardened and/or polished metal, etc.).

The central portion 196 of the stopper 190 can have a planar surface 191 configured to interface with the end 147 of the actuator 145 extending into the passage 166 during resetting of the valve 100. The planar surface 191 of the stopper 190 can be generally centered along the length of the stopper 190 or offset toward either the first end portion 192 or the second end portion 193. The planar surface 191 can be positioned substantially normal to the actuator 145 such that the actuator 145 abuts and positively engages the planar surface 191 during transition of the stopper 190 from the engaged position to the disengaged position. In other embodiments, the surface engaging the actuator 145 can be concave, indented, oblique to the actuator 145 or otherwise non-planar.

As shown in FIGS. 5A-5D, in the engaged position, the terminal end 194 of the stopper 190 is positioned at an upward angle from a horizontal plane extending through the fixed axis of the pin 195, and the planar surface 191 of the central portion 196 of the stopper 190 is positioned below the horizontal plane extending through the fixed axis of the pin 195. In this regard, the terminal end 194, the planar surface 191, and the fixed axis generally form an obtuse triangular configuration in cross-section of the stopper 190, where an obtuse angle of the obtuse triangular configuration is positioned at the planar surface 191 of the central portion 196. The position of the terminal end 194 and the planar surface 191 of the central portion 196 with respect to the fixed axis of the pin 195 can be configured for performance of the valve 100, promote resetting of the valve 100, increased service life of the stopper 190, etc. In one aspect, the terminal end 194 being positioned at an upward angle from the horizontal plane may increase positive engagement with the clapper assembly 170 during transition toward the closed position, may stop the clapper assembly 170 further from the closed position, may promote resetting of the valve 100, among other advantages. Similarly, the planar surface 191 of the central portion 196 being positioned below the horizontal plane may increase positive engagement with the actuator 145 during resetting of the valve 100, among other advantages. In other embodiments, the terminal end 194 and the planar surface 191 of the central portion 196 can be located at any suitable position relative to the horizontal plane extending through the fixed axis of the pin 195.

FIGS. 5E-5H show the clapper assembly 170 with another embodiment of the actuator 145 of FIGS. 5A-5D, shown as an actuator 145' in FIGS. 5E-5H. FIG. 5E shows the clapper assembly 170 in the closed position (a first operative position), FIG. 5F shows the clapper assembly 170 in an open position (a second operative position) permitting fluid communication between the dry and wet sides of the valve 100, FIG. 5G shows the clapper assembly 170 in a stopped position where movement of the clapper assembly 170 to the closed position is prevented by a stopper 190 supported by the body 102 and continuing to permit fluid communication between the dry and wet sides of the valve 100, and FIG. 5H shows the clapper assembly 170 in a reset position by disengaging the stopper 190 from the clapper assembly 170.

As noted above, the stopper 190 is movable about a fixed axis by translation of the resetting knob assembly 150 having the knob 152 exterior to the body 102 and coupled to a threaded portion 146 of an actuator 145' that is supported by the body 102. The actuator 145' has a rod portion with an end 147' extending through the aperture 155 of the body 102 and into the passage 166 to interface with the stopper 190. The rod portion of the actuator 145' has portions 148 and 151 having approximately the same diameter (a first diameter), and portions 149 and 153 having approximately the same diameter (a second diameter), with the second diameter larger than the first diameter. The smaller first diameter provides a first necked down portion 148 and a second necked down portion 151, and the larger second diameter provides a first sealing portion 149 and a second sealing portion 153. The first and second necked down portions 148 and 151 are spaced apart along the rod portion with the first sealing portion 149 positioned therebetween, and the second sealing portion 153 is positioned between the second necked down portion 151 and the end 147'. The aperture 155 can include a separate wear component, such as the actuator insert 156 with the sealing members 158a and 158b to prevent leakage of gas or fluid past the actuator 145' in the position shown in FIGS. 5E-5G. In this position, the sealing member 158a contacts the first sealing portion 149 and the sealing member 158b contacts the second sealing portion 153, each interface configured to create seals to prevent leakage. As will be explained in greater detail below, when the actuator 145' is in a raised, upward position shown in FIG. 5H, the sealing member 158a is adjacent to the first necked down portion 148 and the sealing member 158b is adjacent to the second necked down portion 151, where each of the sealing members 158a and 158b do not contact the first and second necked down portions 148 and 151, respectively.

Releasing the application of force counter to the weight of the knob 152 and/or the actuator 145' cause the force of gravity to return the knob 152 to the first position and the stopper 190 to the engaged position, as shown in FIG. 5E. As noted above, in the position shown in FIG. 5H, the sealing members 158a and 158b are adjacent to and not in contact with the first and second necked down portions 148 and 151, respectively, and as such do not impart friction on the actuator 145' to initially resist return of the actuator 145' toward the position of FIG. 5E. After the actuator 145' has partially returned to the position of Figure the sealing members 158a and 158b reach a position to contact the first and second sealing portions 149 and 153, respectively, to form seals and prevent leakage of gas or fluid past the actuator 145'. In these embodiments, friction between the first and second sealing portions 149 and 153 and the sealing members 158a and 158b may not require lubricant to ensure gravity acting on the knob 152 and/or the actuator 145' returns the knob 152 to the first position after resetting.

Figure 6A:
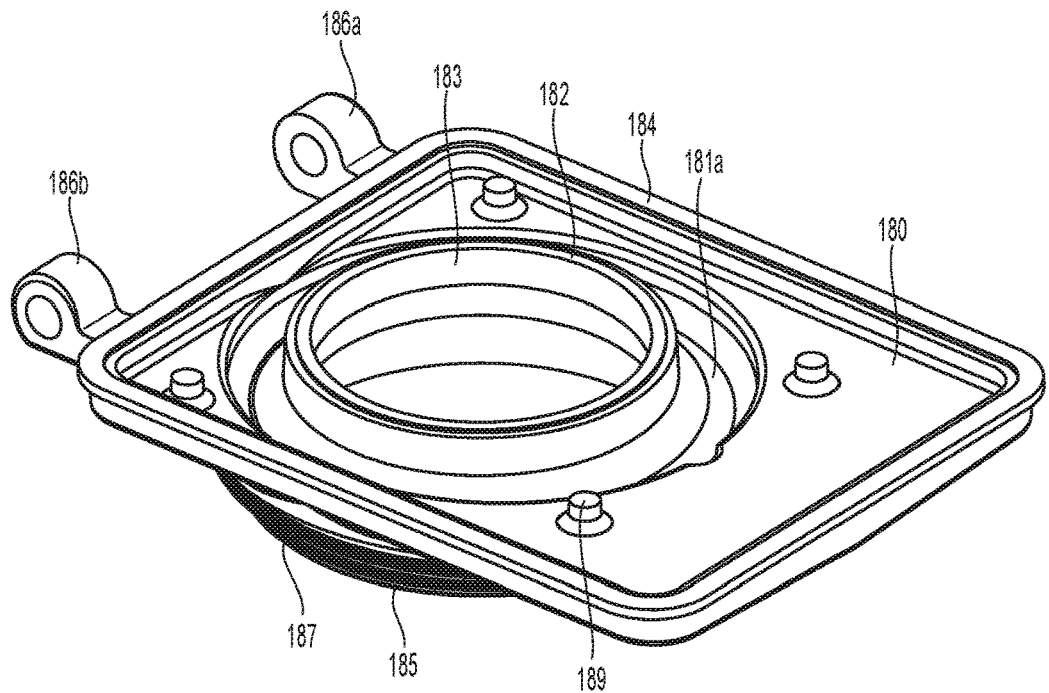
FIGS. 6A-6D are perspective, top plan, rear elevation, and cross-sectional front elevation views, respectively, of a seat of the valve of FIGS. 1-4.
Figure 6B:
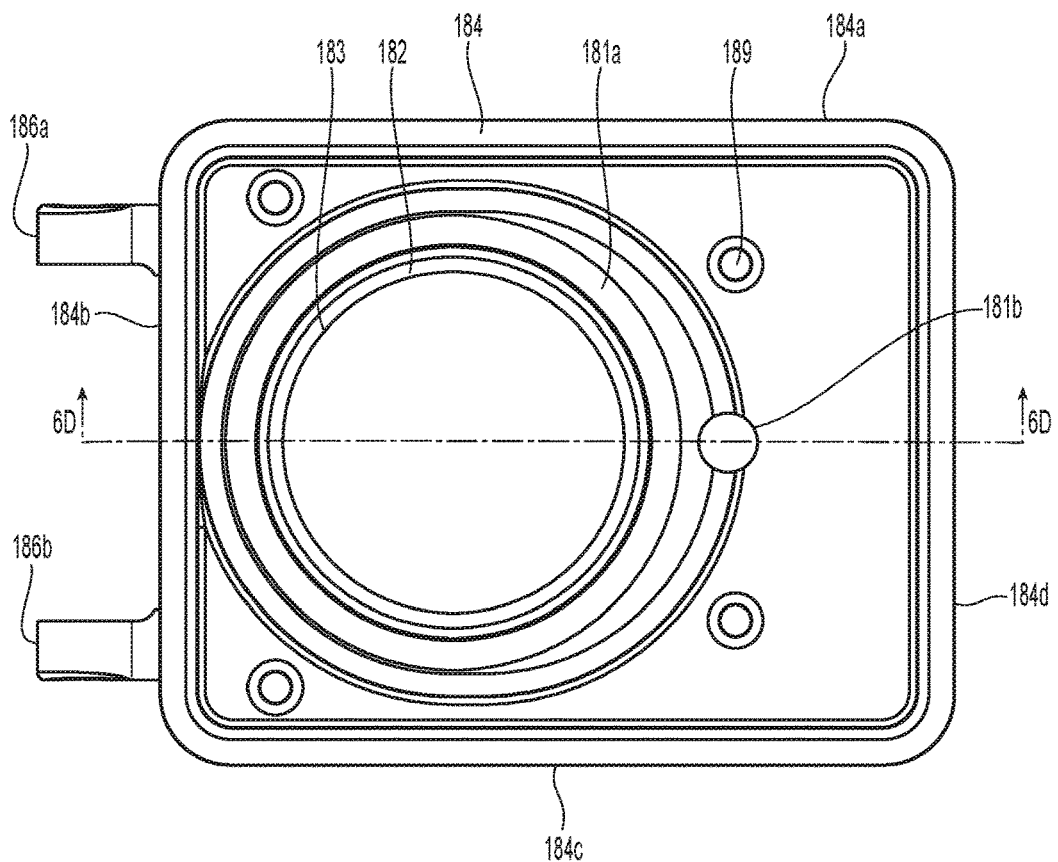
Figure 6C:
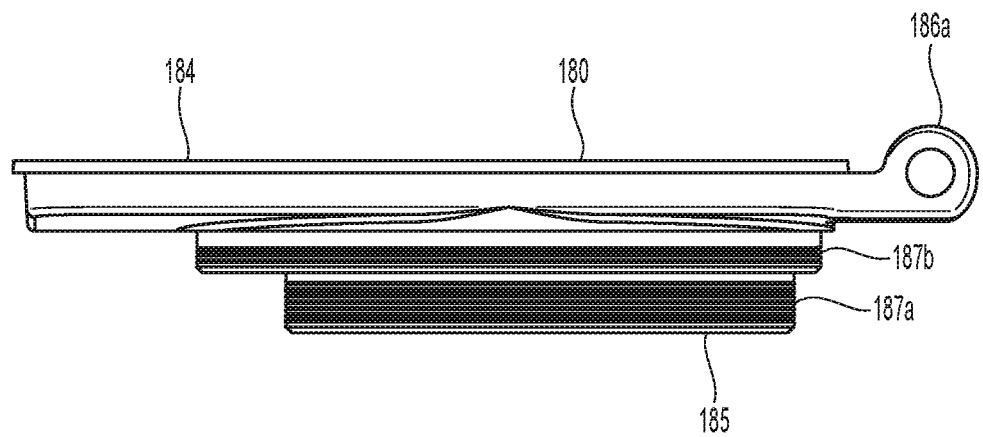
Figure 6D:
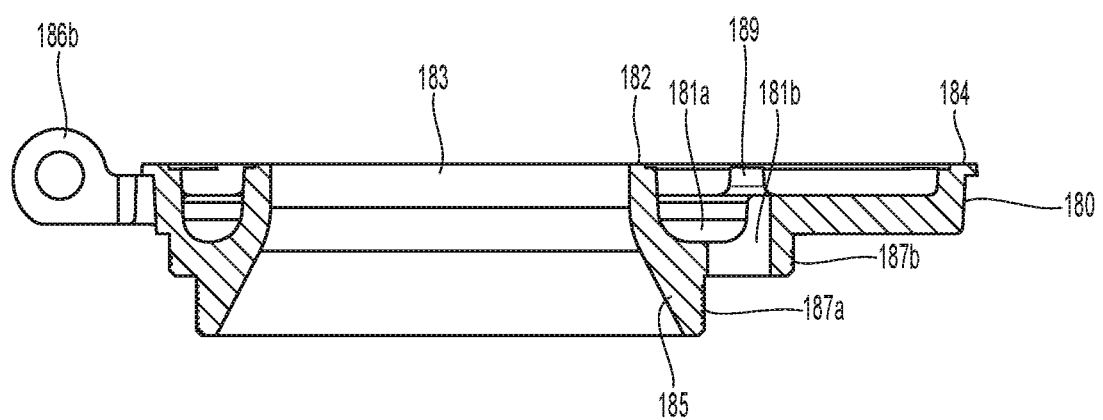

FIGS. 6A-6D show perspective, top plan, rear elevation, and cross-sectional front elevation views, respectively, of the seat of the valve 100. In FIG. 6D, the cross-section is taken along the line 6D-6D shown in FIG. 6B. The seat 180 is disposed in the passage 166 of the body 102 to interface with the clapper assembly 170 and prevent fluid communication between the wet and dry sides of the valve 100. The seat includes a first, wet seating surface 182 defining a first seat axis, and a second, dry seating surface 184 defining a second seat axis, the wet and dry seating surfaces 182 and 184 configured to interface with a sealing member of the clapper assembly 170 (see FIGS. 9A-9D). As shown in FIG. 6D, the wet and dry seating surfaces 182 and 184 can be generally disposed on a common plane preferably perpendicular to the longitudinal axis. In the preferred valve arrangement with the resetting knob assembly 150 below the dry side protrusion 140, the rod intersects the common plane of the wet and dry seating surfaces 182 and 184 within the passage 166 in at least one of the preferred first and second positions of the external knob 152 which is located axially between the inlet 110 and the seat 180. Additionally or alternatively, the rod intersects a plane of the pivot axis of the clapper assembly 170 disposed perpendicular to the longitudinal axis or each of the respective parallel planes of the pivot axes of the clapper assembly 170 and the stopper 190, disposed perpendicular to the longitudinal axis, in either one of the preferred first and second positions of the external knob 152. In an alternative embodiment, one of the wet and dry seating surfaces 182 and 184 can be aligned with different planes offset along the longitudinal axis with respect to the other of the wet and dry seating surfaces 182 and 184 (e.g., the wet seating surface can be positioned below the dry seating surface, etc.). The first seat axis can be substantially aligned with the longitudinal axis of the body 102, and the second seat axis can be laterally offset from the longitudinal axis.

The wet seating surface 182 of the seat 180 has a different shape configuration from the dry seating surface 184. The different shape configuration of the wet and dry seating surfaces 182 and 184 include differing geometric shapes between the surfaces. In some embodiments, the wet seating surface 182 has a circular configuration with a diameter, and the dry seating surface 184 has a non-circular configuration and more preferably a rounded-rectangular configuration with a major width and a minor width. In one preferred embodiment, the rounded-rectangle configuration is offset to the longitudinal axis; and the circular configuration is concentric to the longitudinal axis. In other embodiments, the wet and dry seating surfaces 182 and 184 have any suitable differing geometric shape configurations. The seat 180 includes an inlet portion 185 for sealingly coupling to the inlet 110 of the valve 100, e.g., by threads 187a and 187b, sealing protrusions, etc., such that the fluid is directed through a central opening 183 of the seat during use of the valve 100. The seat can include a trough 181a having a drain port 181b in fluid communication with the low-body drain protrusion 130 to allow all fluid on the dry side of the valve 100 to be drained while resetting the valve 100 for first use or subsequent uses. The seat 180 includes first and second seat knuckles 186a and 186b configured to accept a pin 169 defining a pivot (see FIGS. 5A and 11C) therethrough for pivotable coupling of the clapper assembly 170, the pin defines a clapper pivot axis orthogonal to the longitudinal axis of the body 102. The clapper assembly 170 includes corresponding first and second clapper knuckles 176a and 176b through which the pin 169 extends, permitting pivoting of the clapper assembly 170 about the pin 169 with respect to the seat 180. The seat 180 can also include a plurality of offset protrusions 189 configured to support the clapper assembly 170 and prevent sagging of the sealing surfaces.

As shown most clearly in FIG. 6B, the configuration of the wet and dry seating surfaces 182 and 184 can be such that the perimeter of the circular wet seating surface 182 is positioned inset from the rounded-rectangular dry seating surface 184 (i.e., the dry seating surface 184 cinctures the wet seating surface 182) and is spaced closer to three of the four linear sides of the rounded-rectangle, e.g., closer to from a first side 184a, a second side 184b, and a third side 184c of the dry seating surface 184, and spaced farther away from a fourth side 184d of the dry seating surface 184. In some embodiments, the wet seating surface 182 is generally centered across the minor length of the rounded-rectangular dry seating surface 184 (i.e., equidistant from the first side 184a and the third side 184c), while being positioned closer to the second side 184b of the rounded-rectangle adjacent to the first and second seat knuckles 186a and 186b. In another embodiment, the wet seating surface 182 is generally equidistant from the first, second, and third sides 184a, 184b, and 184c of the rounded-rectangle and spaced farther from the fourth side 184d. For purposes of this disclosure, the distances from the wet seating surface 182 to the linear sides 184a-d of the rounded-rectangle can vary up to 25% and remain within the scope of the term "generally equidistant." In other embodiments, the first seat axis of the wet seating surface 182 is positioned at about a third of the length along the major width of the rounded-rectangle, closer to the first and second seat knuckles 186a and 186b. The dry seating surface 184 can be positioned within the body 102 such that at least the first side 184a and the fourth side 184d of the dry seating surface 184 are positioned laterally equidistant to a first wall 102a of the body 102 lateral to the minor width and a fourth wall 102d of the body 102 lateral to the major width, respectively (see FIG. 12).

Figure 7A:
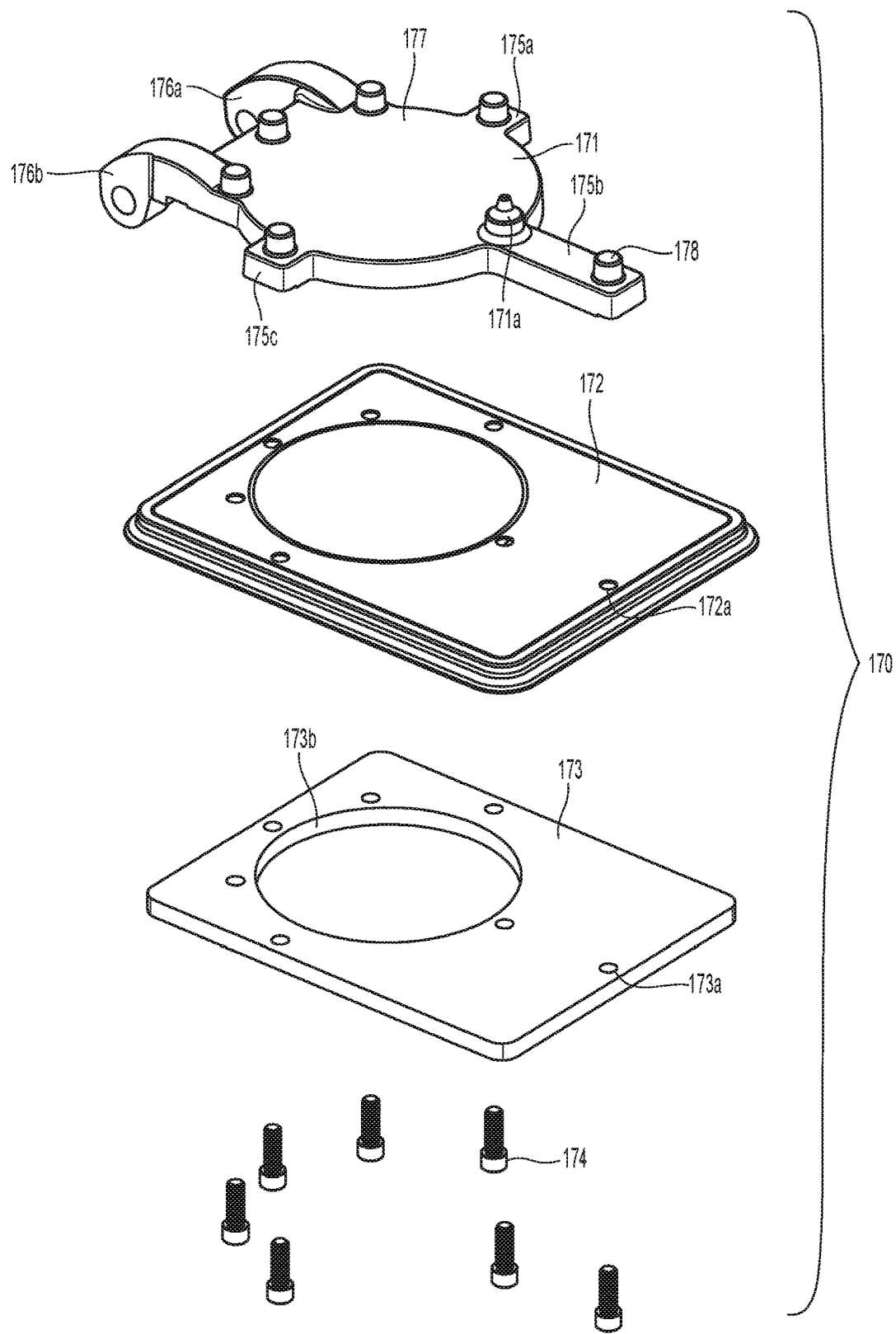
FIGS. 7A-7E are exploded, perspective, top plan, front elevation, and cross-sectional front elevation views, respectively, showing a clapper assembly of the valve of FIGS. 1-4.
Figure 7B:
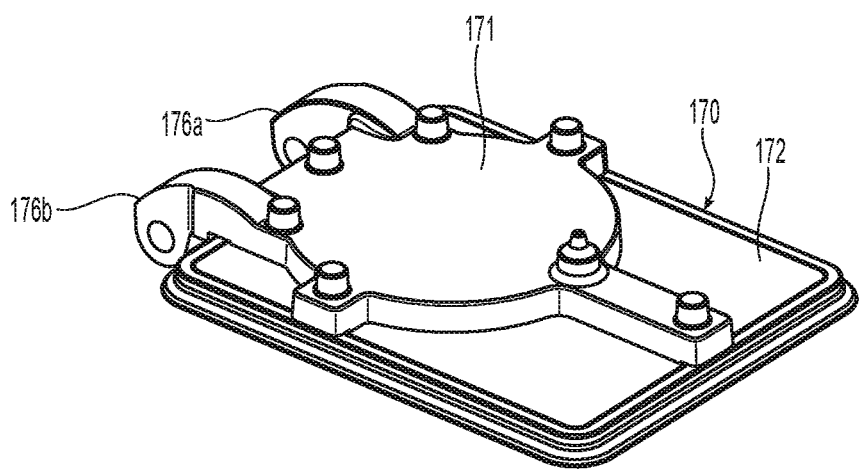
Figure 7C:
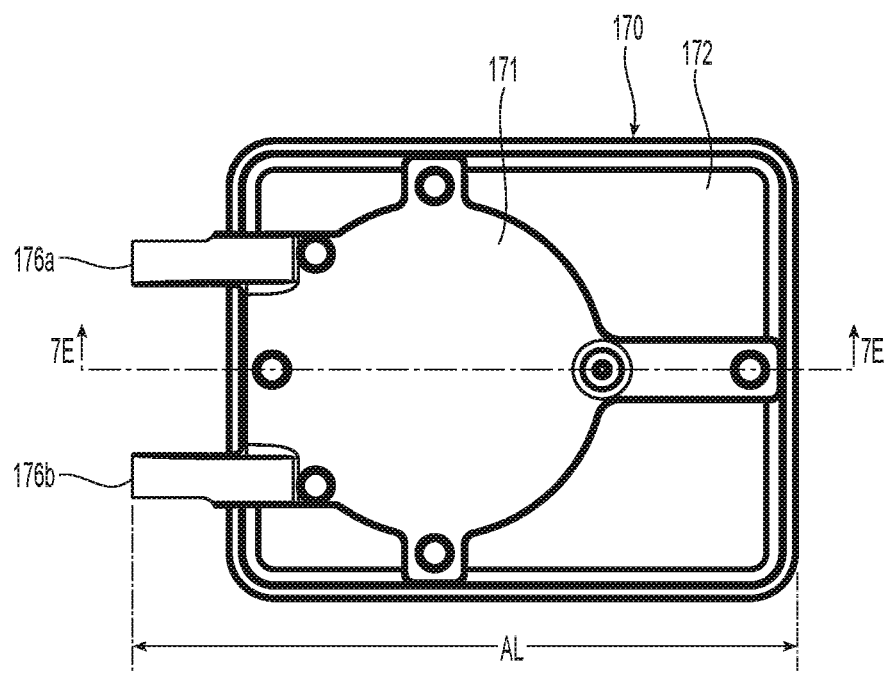
Figure 7D:
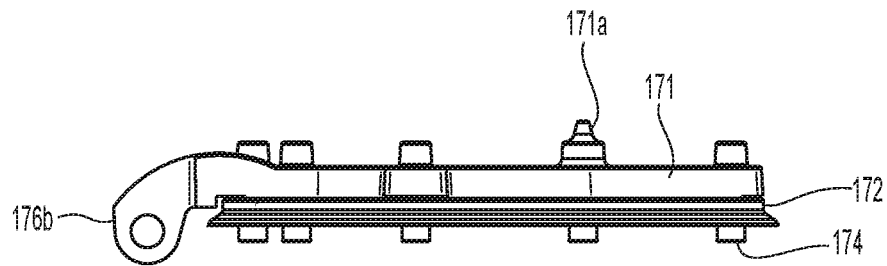
Figure 7E:
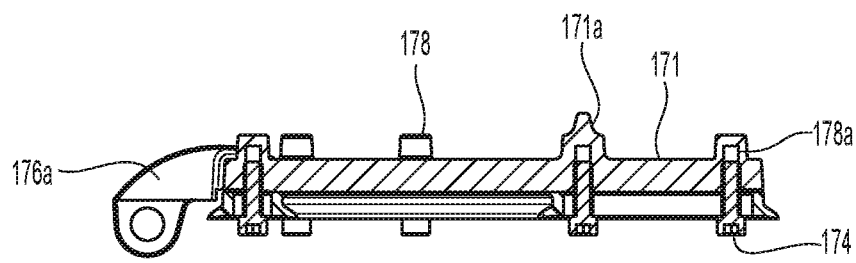

FIGS. 7A-7E show exploded, perspective, top plan, front elevation, and cross-sectional front elevation views, respectively, of the clapper assembly 170 of the valve 100. In FIG. 7E, the cross-section is taken along the line 7E-7E shown in FIG. 7C. The clapper assembly 170 is disposed in the passage 166 of the body 102 and pivotably couplable by the first and second clapper knuckles 176a and 176b to the first and second seat knuckles 186a and 186b to interface with the wet and dry seating surfaces 182 and 184 of the seat 180 and prevent fluid communication between the wet and dry sides of the valve 100. As shown in FIG. 7A, the clapper assembly 170 includes a clapper 171 and a retainer plate 173 sandwiching a unitary sealing member 172 between the clapper 171 and the retainer plate 173. The retainer plate 173 can be coupled to the clapper 171 with a plurality of fasteners 174 extending through apertures 173a in the retainer plate 173, apertures 172a in the unitary sealing member 172, and into corresponding bores 178a in the clapper 171. The bores 178a can have extended protrusions 178 to increase the engagement with the fasteners 174 and are threaded or have other suitable features to receive the fasteners 174 and secure the unitary sealing member 172 between the clapper 171 and the retaining plate 173. The retainer plate 173 can have a central opening 173b through which the wet seating surface 182 extends. The stop protrusion 171a of the clapper generally projects in the same direction as the extended bore protrusions 178.

Figure 8A:
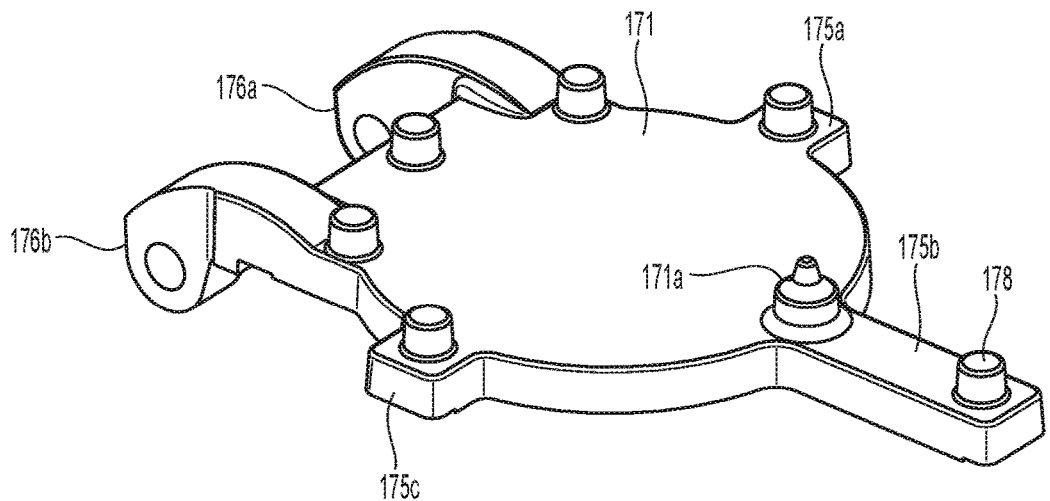
FIGS. 8A-8E are perspective, top plan, bottom plan, front elevation, and cross-sectional front elevation views, respectively, showing a clapper of the clapper assembly of FIGS. 7A-7E.
Figure 8B:
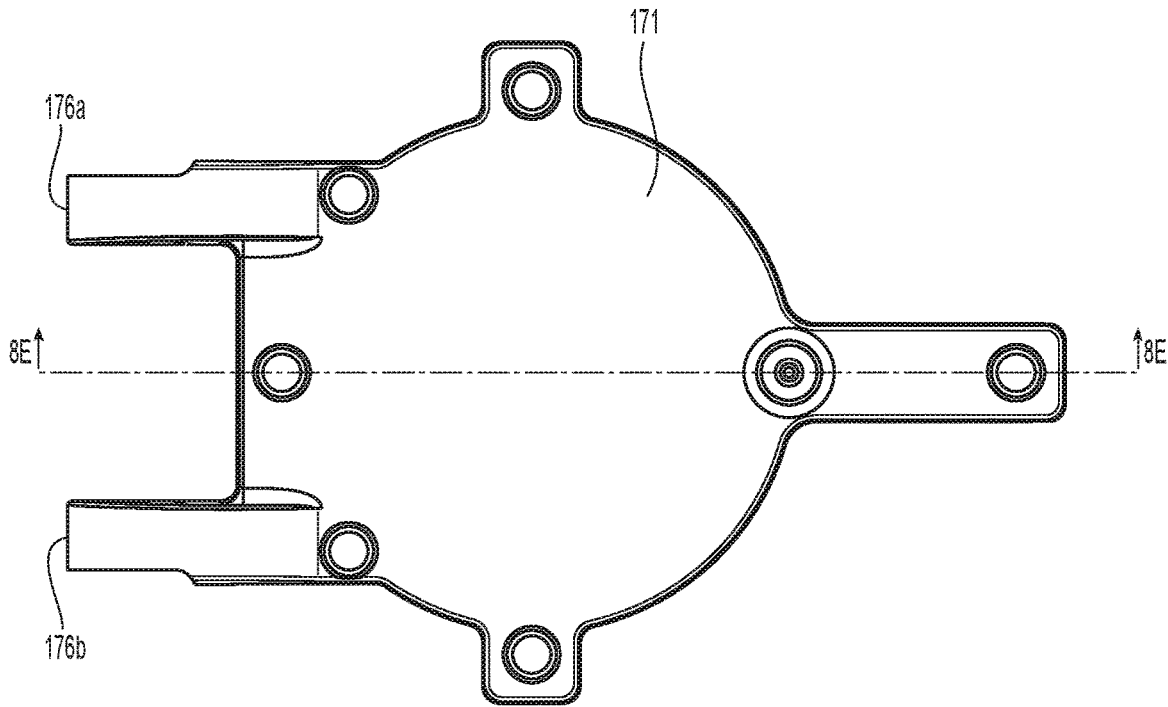
Figure 8C:
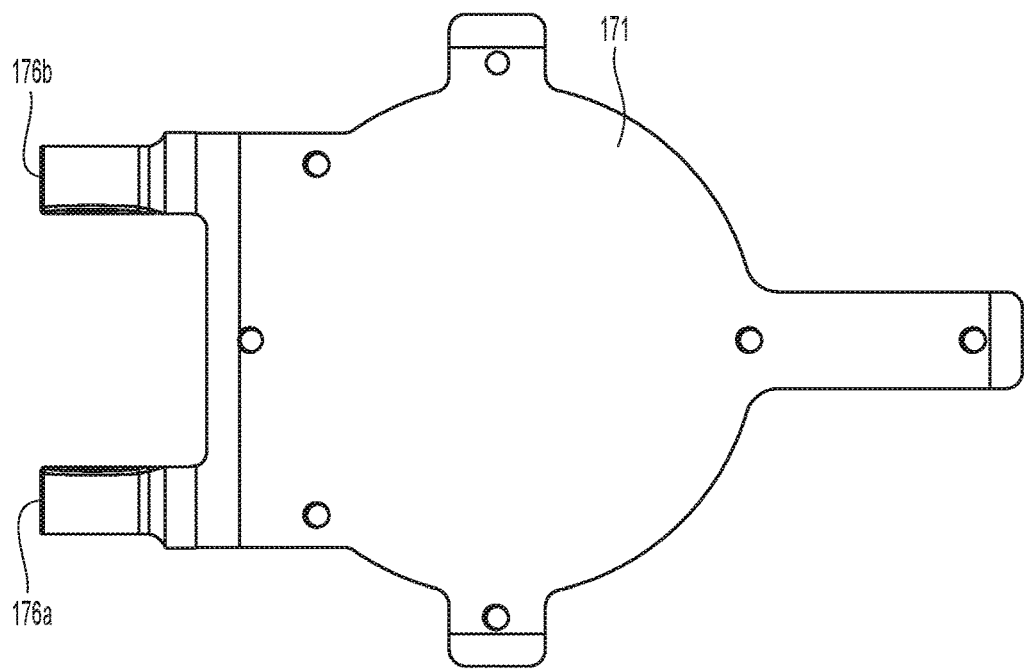
Figure 8D:
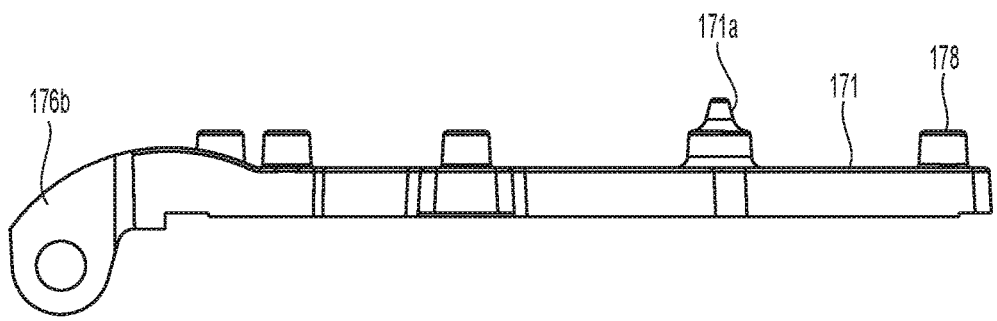
Figure 8E:
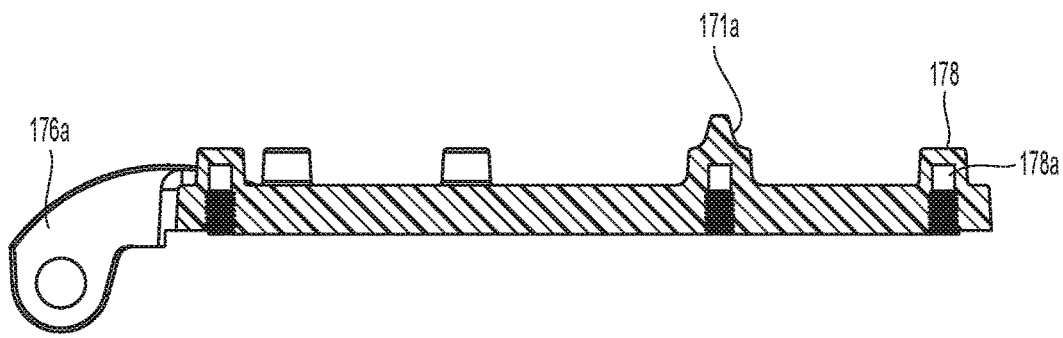

FIGS. 8A-8E show perspective, top plan, bottom plan, front elevation, and cross-sectional front elevation views, respectively, of the clapper 171 of the clapper assembly 170. In FIG. 8E, the cross-section is taken along the line 8E-8E shown in FIG. 8B. The clapper 171 can include first, second, and third protrusions 175a, 175b, and 175c extending radially from a central circular portion 177. The central circular portion 177 generally corresponds to the wet sealing surface, and the first, second, and third protrusions 175a, 175b, and 175c provide support to the larger surface area of the retainer plate 173. In other embodiments, the clapper 171 has any number of protrusions extending radially from the central circular portion 177 (e.g., four, five, six, etc.), or may omit the protrusions (e.g., by covering a substantial portion of the unitary sealing member 172).

Figure 9A:
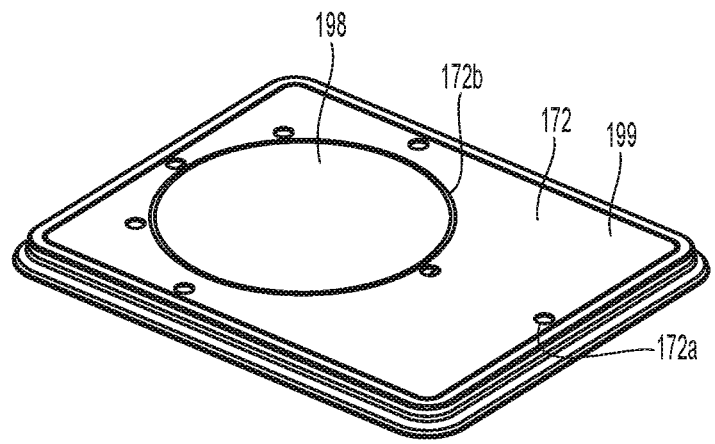
FIGS. 9A-9D are perspective, top plan, front elevation, and cross-sectional front elevation views, respectively, showing a unitary sealing member of the clapper assembly of FIGS. 7A-7E.
Figure 9B:
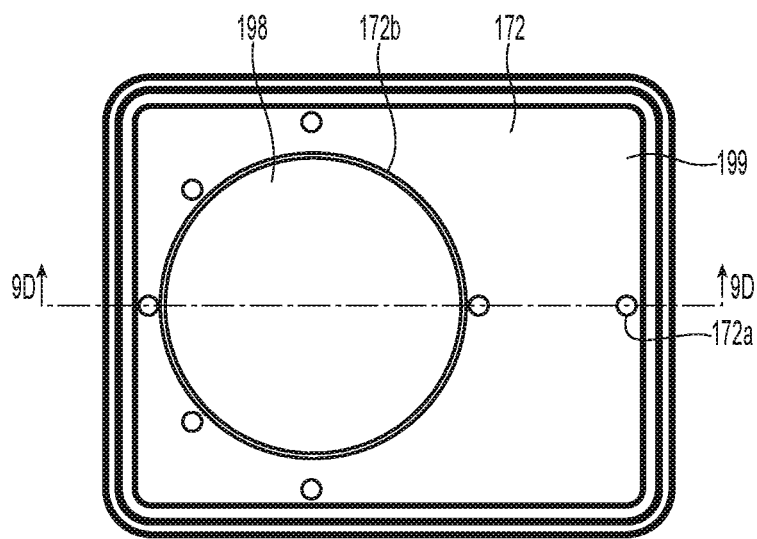
Figure 9C:
Figure 9D:
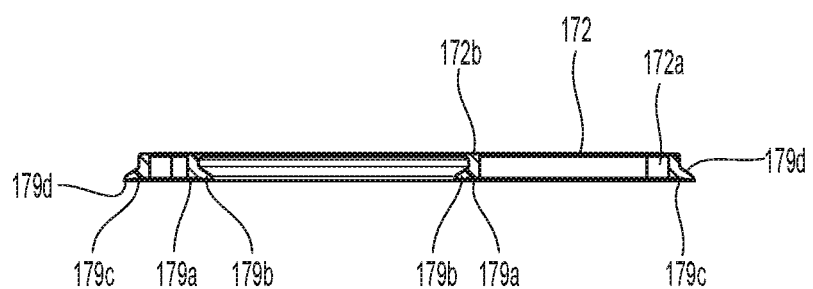

FIGS. 9A-9D show perspective, top plan, front elevation, and cross-sectional front elevation views, respectively, of the unitary sealing member 172 of the clapper assembly 170. In FIG. 9D, the cross-section is taken along the line 9D-9D shown in FIG. 9B. The unitary sealing member 172 is an impervious body having a first, wet sealing surface 179a defining a first seal axis, and a second, dry sealing surface 179c defining a second seal axis. The wet sealing surface 179a can be contiguous to the wet seating surface 182 when the first seal axis is aligned with the first seat axis, and the dry sealing surface 179c can be contiguous to the dry seating surface 184 when the second seal axis is aligned with the second seat axis, defining the closed position of the clapper assembly 170 in which the clapper assembly 170 occludes fluid flow through the passage 166. As shown in FIG. 9D, the wet sealing surface 179a can include a first cantilevered lip 179b extending oblique to the longitudinal axis and the dry sealing surface 179c can include a second cantilevered lip 179d extending oblique to the longitudinal axis. The clapper assembly 170 is pivotable about the clapper pivot axis to a position such that the wet and dry sealing surfaces 179a and 179c are spaced from the wet and dry seating surfaces 182 and 184, and the first seal axis is oblique to the first seat axis and the second seal axis is oblique to the second seat axis, a position in which the clapper assembly 170 permits fluid flow through the passage 166 from the inlet 110 to the outlet 114.

The clapper assembly 170 has a first, wet side surface area 198 exposed to the inlet 110 and a second, dry side surface area 199 exposed to the outlet 114. The wet side surface area 198 has a center of pressure located at a first distance from the clapper pivot axis and the dry side surface area 199 has a center of pressure located a second distance from the clapper pivot axis, where the second distance is greater than the first. The second distance can be greater than about 1.3 and less than 1.4 times the first distance, and the ratio of differential pressure applied to the second center of pressure relative to the first center of pressure can be between 5 and 6.5, or may be at least 5.5 to keep the clapper assembly 170 in the closed position.

Figure 10A:
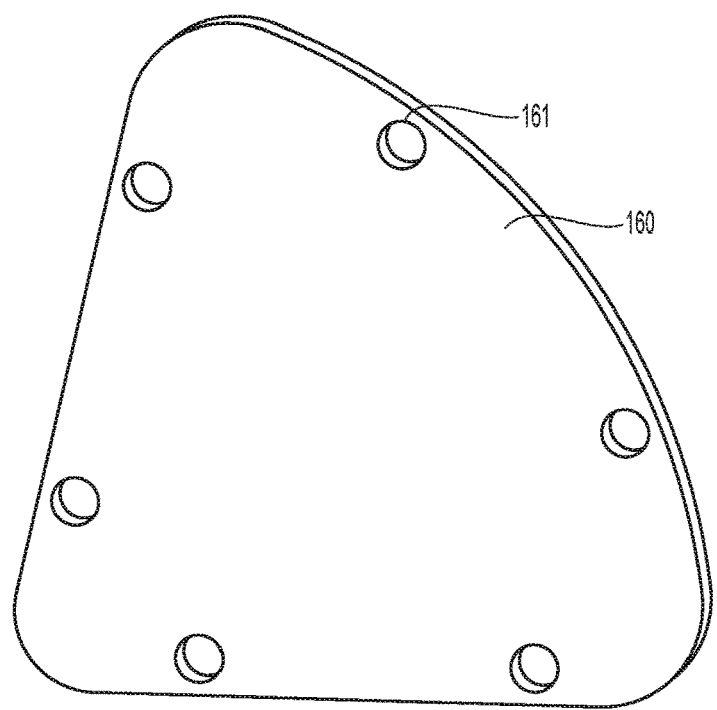
FIGS. 10A and 10B are perspective and front elevation views, respectively, showing a first configuration of a removable cover of the valve of FIGS. 1-4.
Figure 10B:
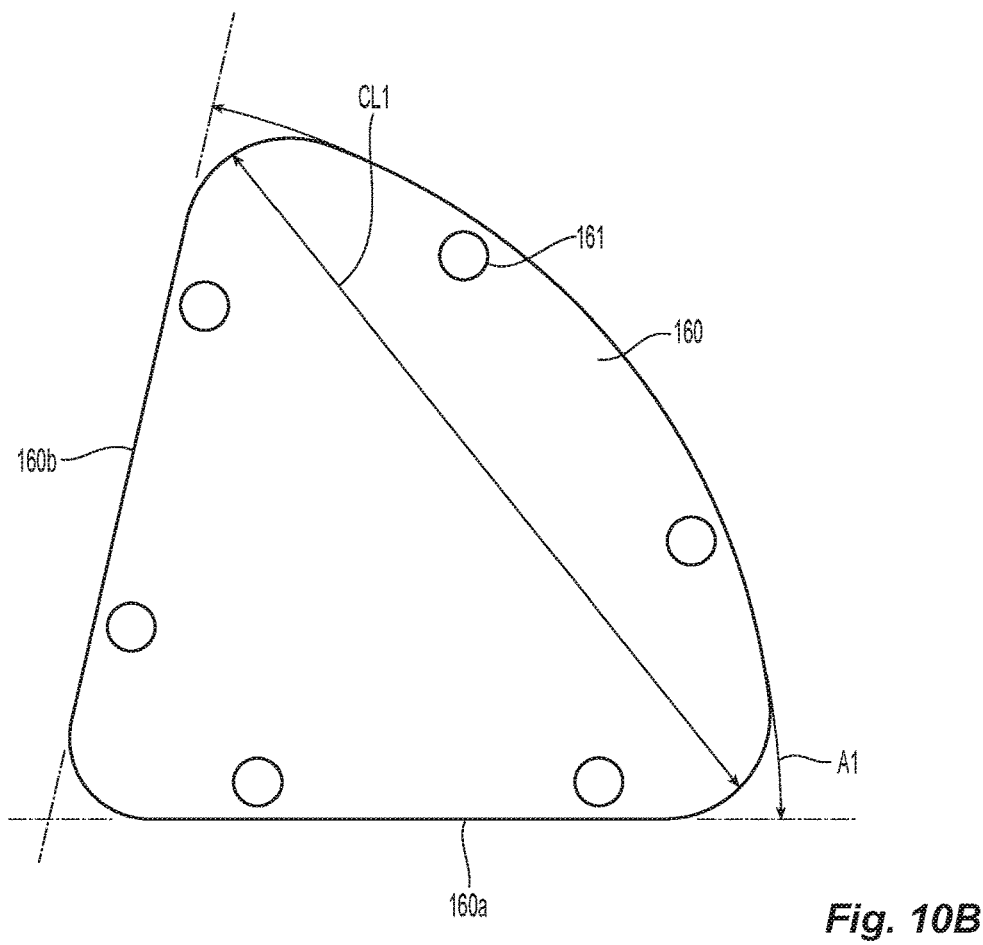

FIGS. 10A and 10B show perspective and front elevation views, respectively, of a first configuration of the removable cover 160 for selectively sealing the access port 164 extending into the passage 166. The cover 160 and/or access port 164 can have a geometric shape that increases the access to the clapper assembly 170. The longest dimension of the access port 164 is longer than the assembled length of the clapper assembly 170. Preferably the access port extends along the longitudinal axis to define a maximum height and extends perpendicular to the longitudinal axis to define a maximum horizontal width. Preferably, the access port extends along the longitudinal axis at a distance that is generally equivalent to the horizontal width of the access port. Accordingly, a preferred embodiment of the valve 100 can have a maximum height that is generally equivalent to the maximum width. The access port can include curvilinear sides instead of linear sides for increased opening area. In some embodiments, the access port has a triangular configuration, with at least first and second linear portions 160*a* and 160*b* corresponding to two edges of the triangular configuration. In a preferred aspect, the pivot axis of the clapper assembly 170 is preferably aligned orthogonal to the vertex of the triangular access port with the two linear side disposed about the pivot axis. In preferred embodiments, the access port 164 has a perimeter defining a rounded-sector geometry. The first linear portion 160*a* can be aligned with the clapper assembly 170 in the closed position and the second linear portion 160*b* can be aligned with the clapper assembly 170 in the open position. The cover 160 includes a plurality of apertures 161 along the perimeter of the cover 160 for securing the cover to the body 102 with a plurality of fasteners 162 (see FIGS. 1 and 4). The cover 160 has a rounded-sector perimeter with an arc A1 defining a chord length CL1 greater than an assembly length AL of the clapper assembly 170 (see FIG. 7C), for passing the clapper assembly 170 through the preferred correspondingly shaped access port 164 as will be shown in greater detail with reference to FIGS. 11A-11C. The chord is generally disposed at an angle from the plane across the wet and dry seating surfaces 182 and 184 (e.g., a horizontal plane).

Figure 11A:
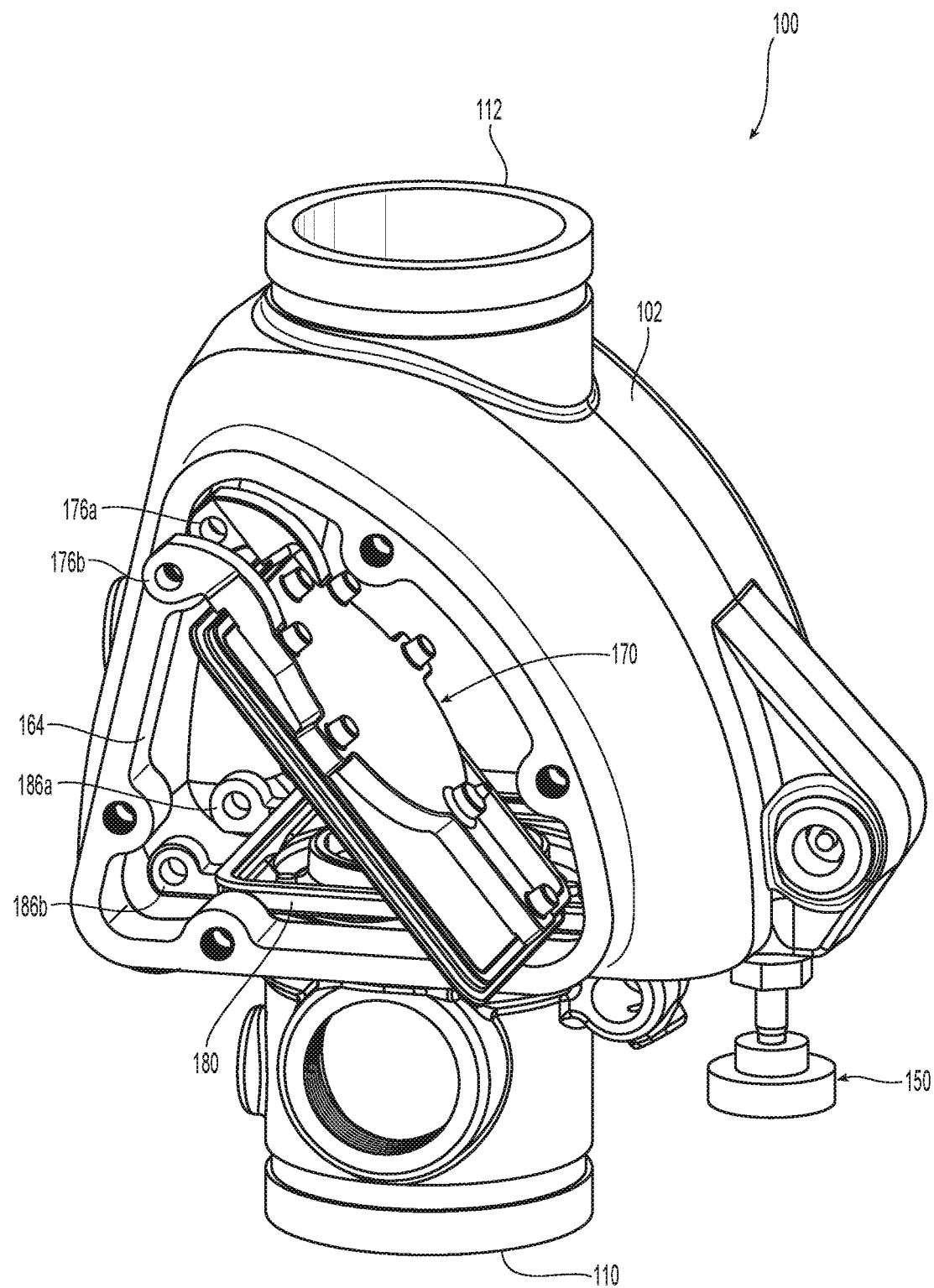
FIGS. 11A-11C are perspective views of the valve of FIGS. 1-4, showing representative installation steps of the clapper assembly of FIGS. 7A-7E.
Figure 11B:
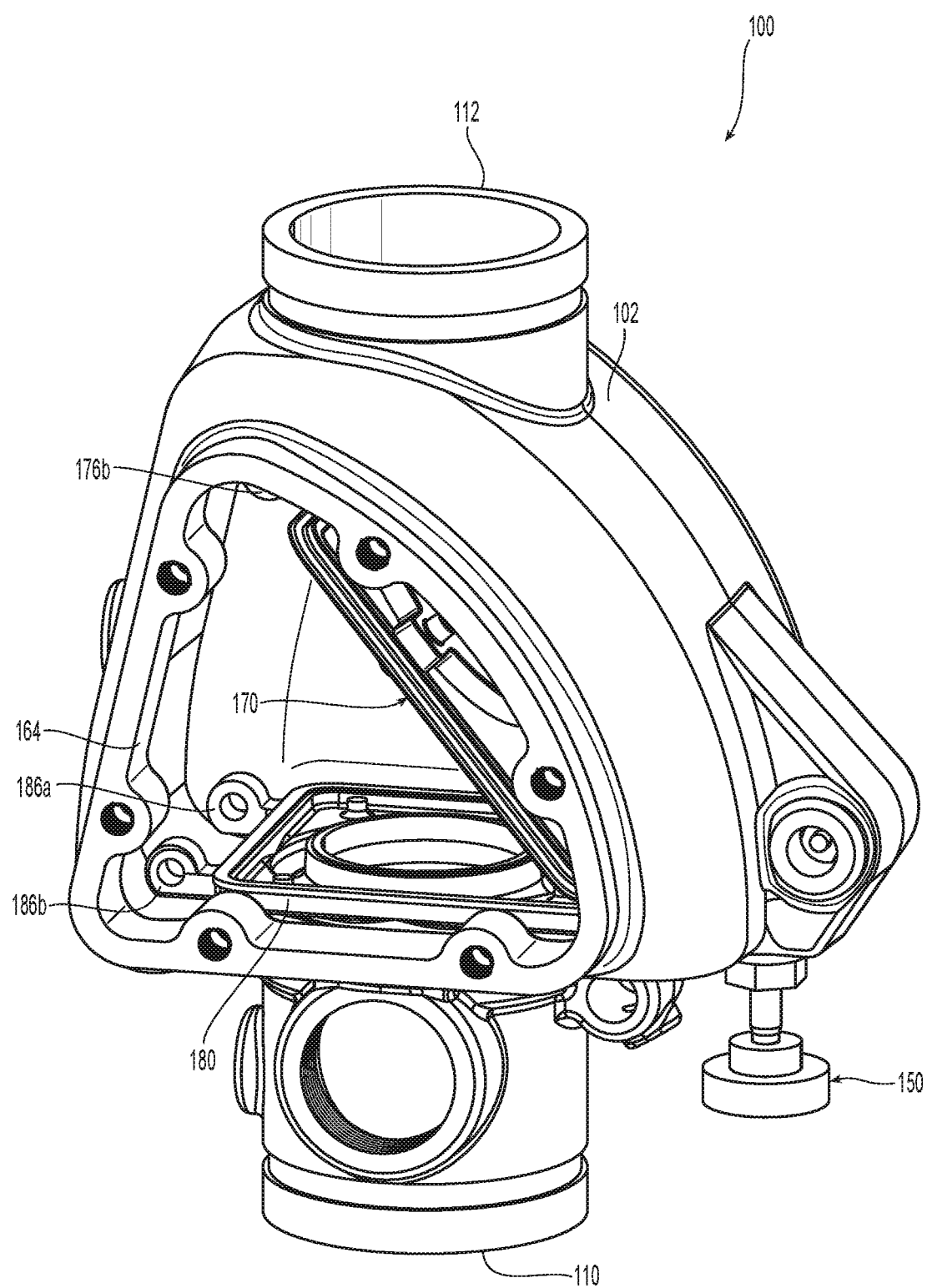
Figure 11C:
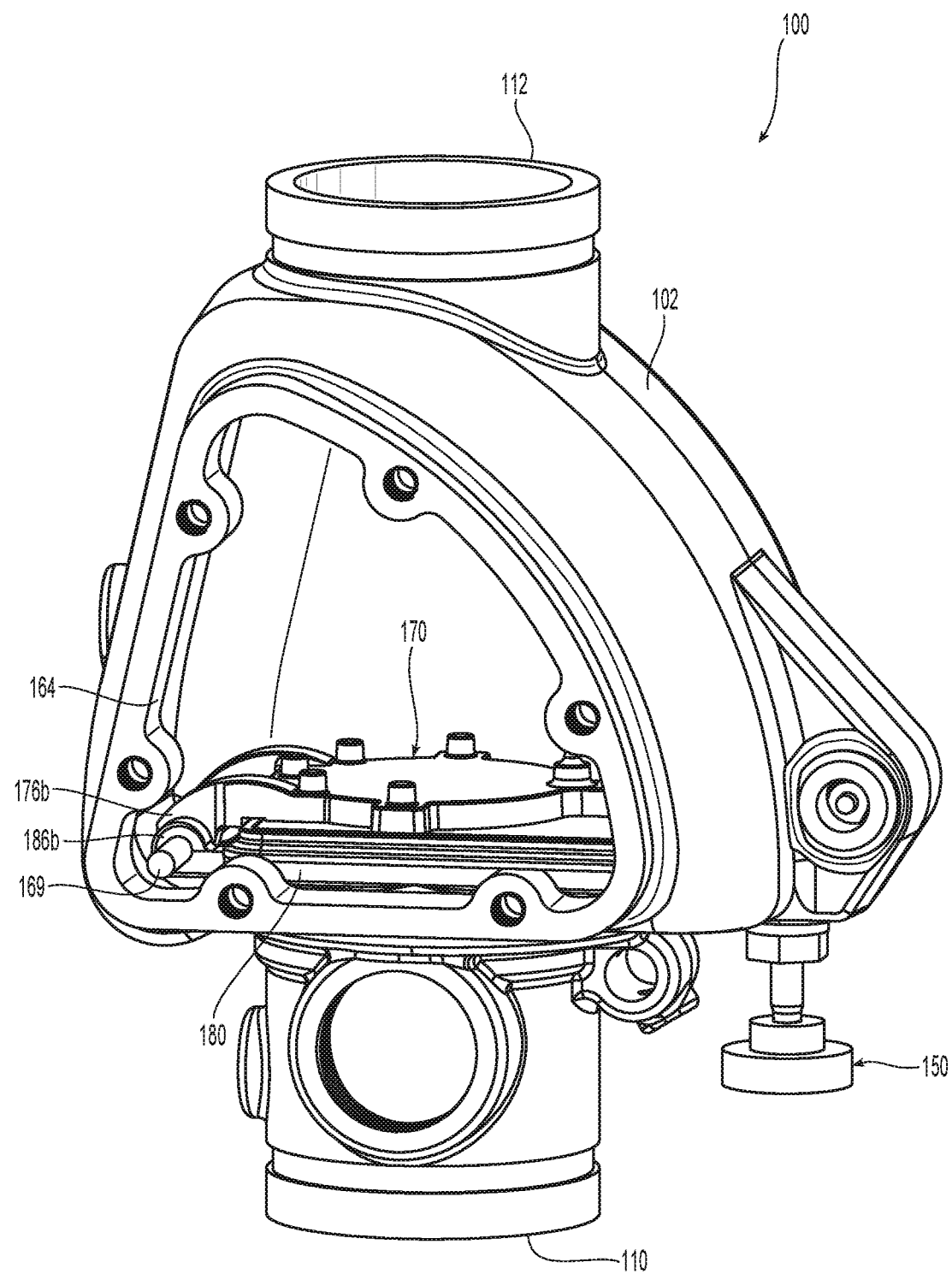

FIGS. 11A-11C show perspective views of representative installation steps of the clapper assembly 170 through the access port of the body 102 of the valve 100. Similar to the cover 160, the access port 164 has a rounded-sector perimeter with an arc defining a chord length greater than the assembly length AL of the clapper assembly 170. The chord length permits insertion of the clapper assembly 170 at an oblique angle from the plane across the wet and dry seating surfaces 182 and 184 such that the first and second clapper knuckles 176*a* and 176*b* do not interfere with the first and second seat knuckles 186*a* and 186*b*. As shown in FIG. 11A, the clapper assembly 170 is first passed through the access port 164 at an angle generally aligned with the chord of the access port 164. As shown in FIG. 11B, the clapper assembly 170 has been fully inserted through the access port 164 and into the passage 166 of the body 102. As shown in FIG. 11C, the clapper assembly 170 is then rotated such that the first and second clapper knuckles 176*a* and 176*b* align with the first and second seat knuckles 186*a* and 186*b* such that a pin 169 can be inserted therethrough. To remove the clapper assembly 170 from the body 102, the pin 169 is removed and the steps are performed in reverse order, e.g., from FIG. 11C, to FIG. 11B, and to FIG. 11A.

As shown in FIGS. 11A-11C, the body 102 can generally comprise a rounded-sector with a volume underneath the clapper assembly 170 in the second position. In this regard, the valve 100 has a lateral profile area (e.g., defined by the outermost perimeter shown in FIG. 5A) and the access port 164 has an opening area, and the opening area to lateral profile area ratio can be between about 20% and 65%. In other embodiments, the access port 164 has an opening area to lateral profile area ratio that is between about 24% and 40%, or between about 26% and 35%.

Figure 4:
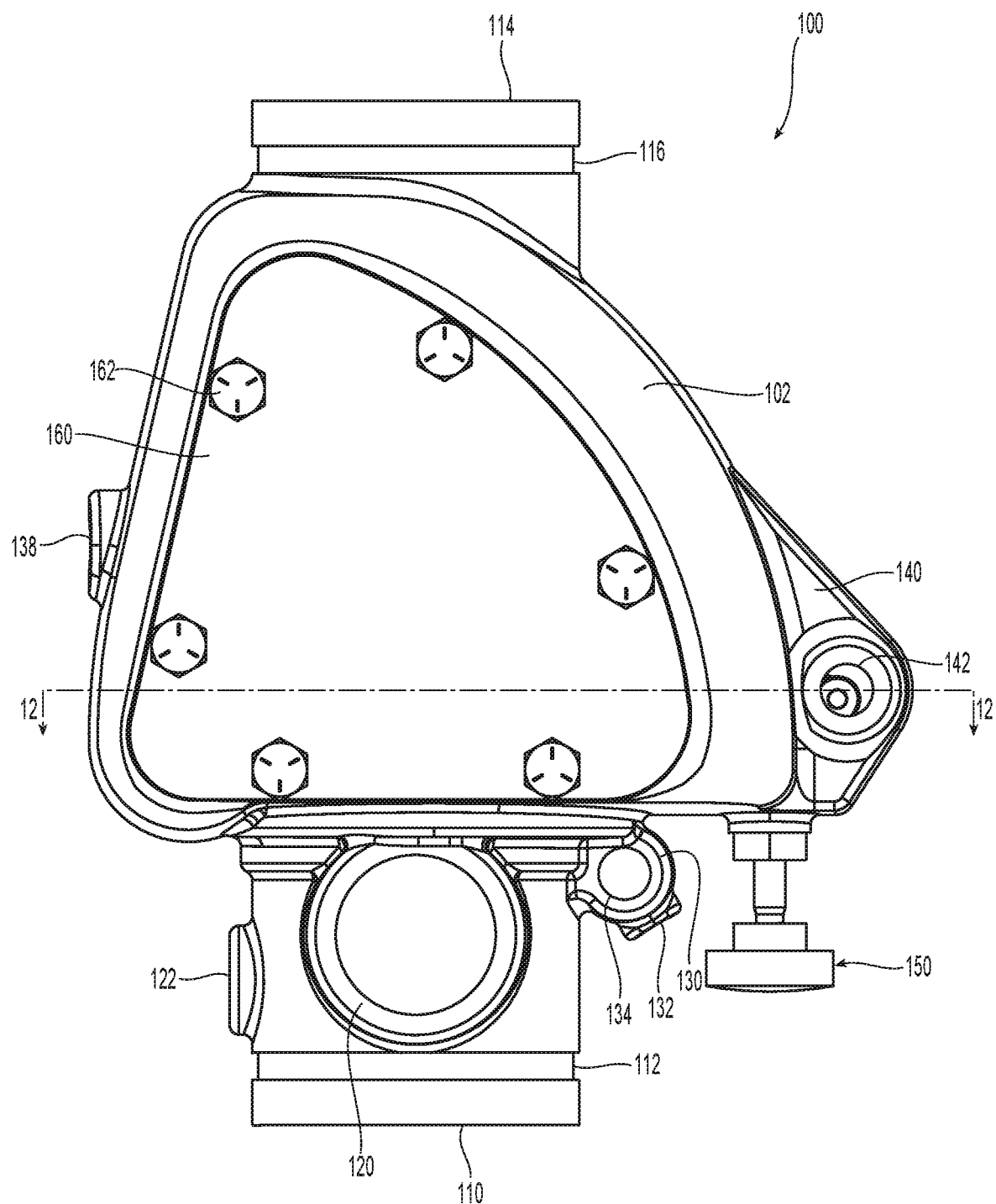
Figure 12:
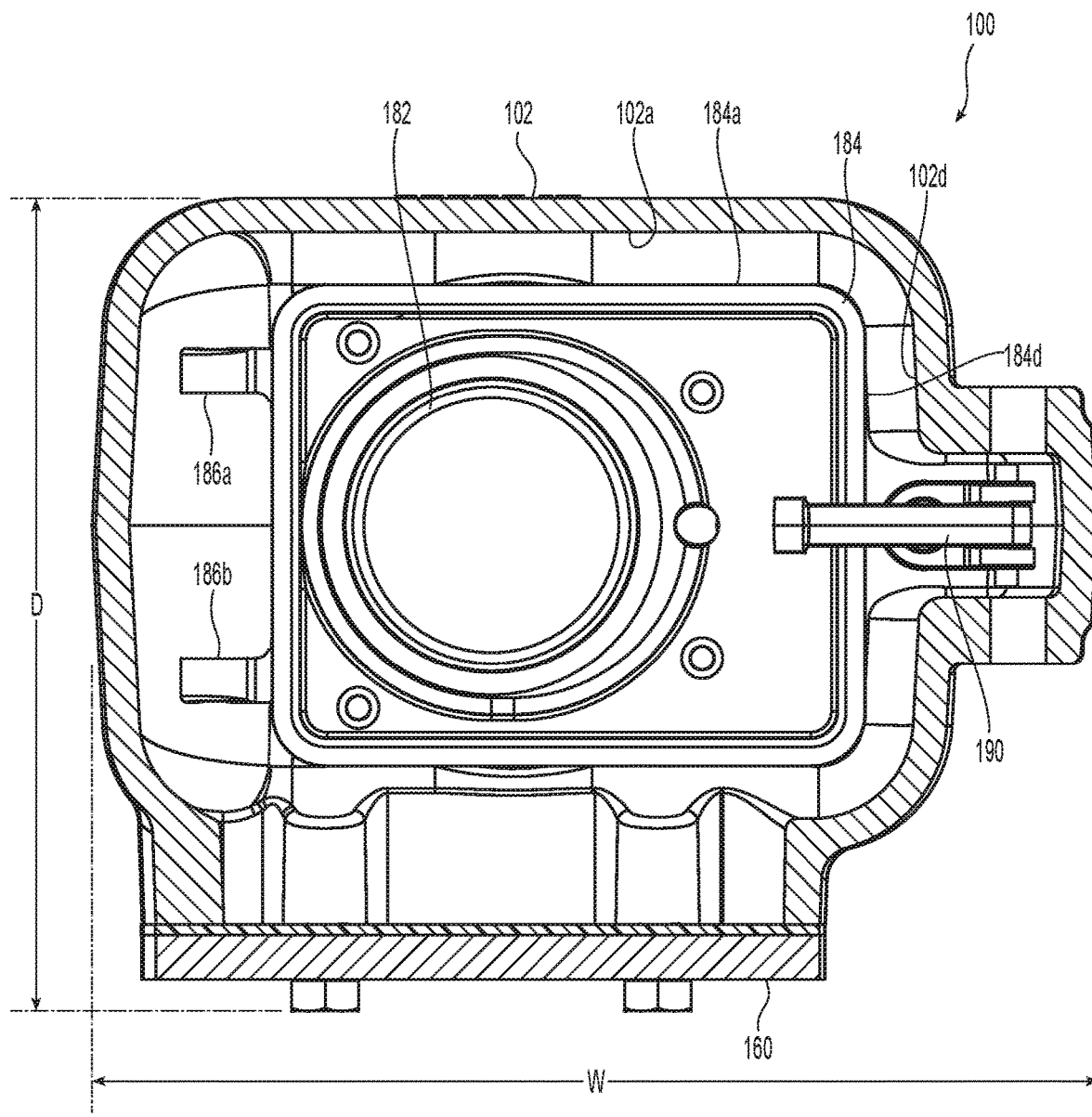
FIG. 12 is a cross-sectional top plan view of the valve of FIGS. 1-4.

FIG. 12 shows a cross-sectional top plan view of the valve 100, with the cross-section is taken along the line 12-12 shown in FIG. 4. As noted above, the dry seating surface 184 can be positioned within the body 102 such that at least the first side 184*a* and the fourth side 184*d* of the dry seating surface 184 are positioned laterally equidistant to a first wall 102*a* and a fourth wall 102*d* of the body 102, respectively. The valve 100 has an overall width W and an overall depth D. The valve 100 can have a depth D to width W ratio between about 69% and 77%. In other embodiments, the valve 100 has a depth D to width W ratio between about 72% and 77%.

Valves of the present disclosure can be generally sized and scaled based on the diameter of the inlet 110, e.g., sized for a 2.5" diameter inlet, a 3" diameter inlet, a 4" diameter inlet, a 6" diameter inlet, etc. In these embodiments, the valve 100 has an inlet 110 diameter to width W ratio between about 27% and 39%, and has an inlet 110 diameter to depth D ratio of between about 38% to 52%.

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology, as those skilled in the relevant art will recognize. While steps are presented in a given order, alternative embodiments may perform steps in a different order. Moreover, the various embodiments described herein may also be combined to provide further embodiments. Reference herein to "one embodiment," "an embodiment," or similar formulations means that a particular feature, structure, operation, or characteristic described in connection with the embodiment can be included in at least one embodiment of the present disclosure. Thus, the appearances of such phrases or formulations herein are not necessarily all referring to the same embodiment.

For ease of reference, identical reference numbers are used to identify similar or analogous components or features throughout this disclosure, but the use of the same reference number does not imply that the features should be construed to be identical. Indeed, in many examples described herein, identically numbered features have a plurality of embodiments that are distinct in structure and/or function from each other. Furthermore, the same shading may be used to indicate materials in cross section that can be compositionally similar, but the use of the same shading does not imply that the materials should be construed to be identical unless specifically noted herein.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Where the context permits, singular or plural terms may also include the plural or singular term, respectively. Additionally, the term "comprising" is used throughout to mean including at least the recited feature(s) such that any greater number of the same feature and/or additional types of other features are not precluded. Directional terms may be used herein to express and clarify the relationship between various elements. It should be understood that such terms do not denote absolute orientation unless as described herein with respect to above and below the protrusion of the valve body with respect to the inlet of the valve body. Further, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

What is claimed is:

1. A dry pipe valve comprising:
a body having a passage extending along a longitudinal axis between an inlet and an outlet, the body defining an access port, an aperture and a protrusion each communicating with the passage;
a cover positioned over the access port;
a seat coupled to the body, the seat having first and second seating surfaces disposed on the seat, the first seating surface having a first configuration and disposed about a first seat axis aligned with the longitudinal axis, the second seating surface having a second configuration and cincturing the first seating surface to define a second seat axis offset to the longitudinal axis, the first seating surface and the second seating surface being generally disposed on a common plane;
a clapper assembly disposed in the passage proximate the seat and mounted via a first pivot in the passage; the clapper assembly having an impervious body with a first sealing surface and a second sealing surface and a knuckle that defines a pivot axis orthogonal to the longitudinal axis and the access port, the first sealing surface defining a first seal axis, the second sealing surface defining a second seal axis, the first sealing surface being contiguous to the first seating surface with the first seal axis aligned with the first seat axis and the second sealing surface being contiguous to the second seating surface with the second seal axis aligned with the second seat axis to occlude fluid flow through the passage in a closed position, and the first sealing surface being spaced from the first seating surface with the first seal axis oblique to the first seat axis and the second sealing surface being spaced from the second seating surface with the second seal axis oblique to the second seat axis to permit fluid flow through the passage in an open position;
a stopper disposed in the passage and mounted on a second pivot, the stopper being in contact with the clapper assembly to define a stopped position of the clapper assembly between the open position and the closed position; and
a resetting knob assembly to interface with and move the stopper and permit the clapper assembly to move from the stopped position to the closed position, the resetting knob assembly including a rod having a first end and a second end with a knob affixed to the second end, the rod being disposed in the aperture and supported by the body with the first end in the passage and the knob external to the body,
wherein the resetting knob assembly is positioned below the protrusion and wherein in the stopped position, the knob is translatable from a first position to a second position in a direction from the inlet toward the outlet, wherein in the first position, the first end of the rod is axially spaced from the stopper and wherein in the second position, the first end of the rod interfaces and moves the stopper, permitting the clapper assembly to move from the stopped position to the closed position,
wherein the resetting knob assembly includes a wear component inserted and supported in the aperture, the wear component including at least one seal member disposed and supported in the aperture, and wherein in the first and second position of the knob, the at least one seal member is adjacent and interfaced with the rod; and
wherein the at least one seal member interfaces with the rod to prevent leakage past the resetting knob assembly with the knob in the first position, the rod including a plurality of rod portions between the first end and the second end including at least one sealing portion defining a first diameter and at least one necked down portion defining a second diameter smaller than the first diameter, wherein in the first position of the knob, the at least one seal member is adjacent and interfaced with the at least one sealing portion, and wherein in the second position of the knob, the at least one sealing member is adjacent and out of contact with the at least one necked down portion.

2. The dry pipe valve of claim 1, wherein at least one of the first and second positions, the rod intersects the common plane and the knob is located axially between the inlet and the seat.

3. The dry pipe valve of claim 1, wherein the knob is gravity-biased into the first position.

4. The dry pipe valve of claim 1,
wherein the first configuration of the first seating surface and the second configuration of the second seating surface are of different geometric configurations, and
wherein the first configuration comprises a circular configuration centered about the first seat axis and the second configuration comprises a rounded-rectangular configuration centered about the second seat axis.

5. The dry pipe valve of claim 4, wherein the rounded-rectangular configuration defines a major width and a minor width, the body further includes a first wall lateral to the minor width and a second wall lateral to the major width, the first and second walls being spaced equidistantly from a perimeter of the clapper assembly.

6. The dry pipe valve of claim 1,
wherein the clapper assembly has an assembly length and the access port comprises a rounded-sector perimeter defining a chord length greater than the assembly length of the clapper assembly, the chord length being disposed at an oblique angle from the common plane of the seat.

7. The dry pipe valve of claim 6, wherein the access port has a maximum height defined in a direction parallel to the longitudinal axis and a maximum width in a direction perpendicular to the maximum height, the maximum height being generally equivalent to the maximum width of the access port.

8. The dry pipe valve of claim 6, wherein the rounded-sector perimeter has two linear portions with one of the two linear portions aligned with the clapper assembly in the closed position.

9. A dry pipe valve comprising:
a body having a passage extending along a longitudinal axis between an inlet and an outlet, the body defining an access port, an aperture and a protrusion each communicating with the passage;
a cover positioned over the access port;
a seat coupled to the body, the seat having first and second seating surfaces disposed on the seat, the first seating surface having a first configuration and disposed about a first seat axis aligned with the longitudinal axis, the second seating surface having a second configuration and cincturing the first seating surface to define a second seat axis offset to the longitudinal axis, the first seating surface and the second seating surface being generally disposed on a common plane;

a clapper assembly disposed in the passage proximate the seat and mounted via a first pivot in the passage; the clapper assembly having an impervious body with a first sealing surface and a second sealing surface and a knuckle that defines a pivot axis orthogonal to the longitudinal axis and the access port, the first sealing surface defining a first seal axis, the second sealing surface defining a second seal axis, the first sealing surface being contiguous to the first seating surface with the first seal axis aligned with the first seat axis and the second sealing surface being contiguous to the second seating surface with the second seal axis aligned with the second seat axis to occlude fluid flow through the passage in a closed position, and the first sealing surface being spaced from the first seating surface with the first seal axis oblique to the first seat axis and the second sealing surface being spaced from the second seating surface with the second seal axis oblique to the second seat axis to permit fluid flow through the passage in an open position;

a stopper disposed in the passage and mounted on a second pivot, the stopper being in contact with the clapper assembly to define a stopped position of the clapper assembly between the open position and the closed position; and a resetting knob assembly to interface with and move the stopper and permit the clapper assembly to move from the stopped position to the closed position, the resetting knob assembly including a rod having a first end and a second end with a knob affixed to the second end, the rod being disposed in the aperture and supported by the body with the first end in the passage and the knob external to the body, wherein the resetting knob assembly is positioned below the protrusion and wherein in the stopped position, the knob is translatable from a first position to a second position in a direction from the inlet toward the outlet, wherein in the first position, the first end of the rod is axially spaced from the stopper and wherein in the second position, the first end of the rod interfaces and moves the stopper, permitting the clapper assembly to move from the stopped position to the closed position, and wherein the stopper includes:
a first end portion with a bore having a pin to form the second pivot;
a second end portion at a fixed radial distance from the pin for engagement with the clapper assembly in the stopped position; and
a central portion between the first end portion and the second end portion, wherein in the second position of the knob, the first end of the rod interfaces the central portion of the stopper.

10. The dry pipe valve of claim 9, wherein the resetting knob assembly includes a wear component inserted and supported in the aperture, the wear component including at least one seal member disposed and supported in the aperture, and wherein in the first and second position of the knob, the at least one seal member is adjacent and interfaced with the rod.

11. The dry pipe valve of claim 9, wherein in the first position of the knob, the central portion has a first planar surface in contact with the aperture and extends parallel to the common plane, the stopper including a second planar surface extending between and contiguous with each of the second end portion and the first planar surface, the second planar surface being obtuse with respect to the first planar surface so as to locate the second end portion axially between the second pivot and the outlet.

12. The dry pipe valve of claim 11, wherein in the first position and the second position of the knob, the second end portion of the stopper is located axially between the second pivot and the outlet.

13. The dry pipe valve of claim 9, wherein in the first position of the knob, each of the first end portion and the second end portion are axially located between the central portion and the outlet.

14. The dry pipe valve of claim 9, wherein in the first configuration of the first seating surface and the second configuration of the second seating surface are of different geometric configurations.

15. The dry pipe valve of claim 9, wherein the impervious body of the clapper assembly comprises a unitary polymeric sealing member forming the first and second sealing surfaces, at least one of the first and second sealing surfaces including cantilevered lips extending oblique to the longitudinal axis.

16. The dry pipe valve of claim 9, wherein the clapper assembly includes a stop protrusion that interfaces the body in the open position of the clapper assembly.

17. The dry pipe valve of claim 9, wherein the body defines a lateral profile area and the access port defines an opening area and an opening area to lateral area ratio that ranges between 25% and 65%.

18. The dry pipe valve of claim 17, wherein the lateral profile area defines an overall width of the body and the body defines an overall depth transverse to the width and a depth to width ratio between 69% and 77%.

19. The dry pipe valve of claim 9, wherein at least one of the first and second positions, the rod intersects the common plane and the knob is located axially between the inlet and the seat.

20. The dry pipe valve of claim 19, wherein the knob is gravity-biased into the first position.

21. The dry pipe valve of claim 19, wherein the resetting knob assembly includes a wear component inserted and supported in the aperture, the wear component including at least one seal member disposed and supported in the aperture, and wherein the first and second position of the knob, the at least one seal member is adjacent and interfaced with the rod.

22. The dry pipe valve of claim 21, wherein the at least one seal member interfaces with the rod to prevent leakage past the resetting knob assembly with the knob in the first position, the rod including a plurality of rod portions between the first end and the second end including at least one sealing portion defining a first diameter and at least one necked down portion defining a second diameter smaller than the first diameter, wherein in the first position of the knob, the at least one seal member is adjacent and interfaced with the at least one sealing portion, and wherein in the second position of the knob, the at least one sealing member is adjacent and out of contact with the at least one necked down portion.

23. The dry pipe valve of claim 19, wherein the first configuration comprises a circular configuration centered about the first seat axis and the second configuration comprises a rounded-rectangular configuration centered about the second seat axis.

24. The dry pipe valve of claim 23, wherein the rounded-rectangular configuration defines a major width and a minor width, the body further includes a first wall lateral to the minor width and a second wall lateral to the major width, the first and second walls being spaced equidistantly from a perimeter of the clapper assembly.

25. The dry pipe valve of claim 19, wherein the clapper assembly has an assembly length and the access port comprises a rounded-sector perimeter defining a chord length greater than the assembly length of the clapper assembly, the chord length being disposed at an oblique angle from the common plane of the seat.

26. The dry pipe valve of claim 25, wherein the access port has a maximum height defined in a direction parallel to the longitudinal axis and a maximum width in a direction perpendicular to the maximum height, the maximum height being generally equivalent to the maximum width of the access port.

27. The dry pipe valve of claim 26, wherein the rounded-sector perimeter has two linear portions with one of the two linear portions aligned with the clapper assembly in the closed position.

28. The dry pipe valve of claim 26, wherein the protrusion of the body is located axially between the outlet and the seat, the protrusion including a first lateral port and a second lateral port each in communication with the passage, the first and second lateral ports being spaced apart from another along a pivot axis of the stopper extending along the second pivot.

29. A dry pipe valve comprising:
a body having a passage extending along a longitudinal axis between an inlet and an outlet, the body defining an access port, an aperture and a protrusion each communicating with the passage;
a cover positioned over the access port;
a seat coupled to the body, the seat having first and second seating surfaces disposed on the seat, the first seating surface having a first configuration and disposed about a first seat axis aligned with the longitudinal axis, the second seating surface having a second configuration and cincturing the first seating surface to define a second seat axis offset to the longitudinal axis, the first seating surface and the second seating surface being generally disposed on a common plane;
a clapper assembly disposed in the passage proximate the seat and mounted via a first pivot in the passage; the clapper assembly having an impervious body with a first sealing surface and a second sealing surface and a knuckle that defines a pivot axis orthogonal to the longitudinal axis and the access port, the first sealing surface defining a first seal axis, the second sealing surface defining a second seal axis, the first sealing surface being contiguous to the first seating surface with the first seal axis aligned with the first seat axis and the second sealing surface being contiguous to the second seating surface with the second seal axis aligned with the second seat axis to occlude fluid flow through the passage in a closed position, and the first sealing surface being spaced from the first seating surface with the first seal axis oblique to the first seat axis and the second sealing surface being spaced from the second seating surface with the second seal axis oblique to the second seat axis to permit fluid flow through the passage in an open position;
a stopper disposed in the passage and mounted on a second pivot, the stopper being in contact with the clapper assembly to define a stopped position of the clapper assembly between the open position and the closed position; and
a resetting knob assembly to interface with and move the stopper and permit the clapper assembly to move from the stopped position to the closed position, the resetting knob assembly including a rod having a first end and a second end with a knob affixed to the second end, the rod being disposed in the aperture and supported by the body with the first end in the passage and the knob external to the body,
wherein the resetting knob assembly is positioned below the protrusion and wherein in the stopped position, the knob is translatable from a first position to a second position in a direction from the inlet toward the outlet, wherein in the first position, the first end of the rod is axially spaced from the stopper and wherein in the second position, the first end of the rod interfaces and moves the stopper, permitting the clapper assembly to move from the stopped position to the closed position, and
wherein the protrusion of the body is located axially between the outlet and the seat, the protrusion including a first lateral port and a second lateral port each in communication with the passage, the first and second lateral ports being spaced apart from another along a pivot axis of the stopper extending along the second pivot.

30. A dry pipe valve comprising:
a body having a passage extending along a longitudinal axis between an inlet and an outlet, the body defining an access port, an aperture and a protrusion each communicating with the passage;
a cover positioned over the access port;
a seat coupled to the body, the seat having first and second seating surfaces disposed on the seat, the first seating surface having a first configuration and disposed about a first seat axis aligned with the longitudinal axis, the second seating surface having a second configuration and cincturing the first seating surface to define a second seat axis offset to the longitudinal axis, the first seating surface and the second seating surface being generally disposed on a common plane;
a clapper assembly disposed in the passage proximate the seat and mounted via a first pivot in the passage; the clapper assembly having an impervious body with a first sealing surface and a second sealing surface and a knuckle that defines a pivot axis orthogonal to the longitudinal axis and the access port, the first sealing surface defining a first seal axis, the second sealing surface defining a second seal axis, the first sealing surface being contiguous to the first seating surface with the first seal axis aligned with the first seat axis and the second sealing surface being contiguous to the second seating surface with the second seal axis aligned with the second seat axis to occlude fluid flow through the passage in a closed position, and the first sealing surface being spaced from the first seating surface with the first seal axis oblique to the first seat axis and the second sealing surface being spaced from the second seating surface with the second seal axis oblique to the second seat axis to permit fluid flow through the passage in an open position;
a stopper disposed in the passage and mounted on a second pivot, the stopper being in contact with the clapper assembly to define a stopped position of the clapper assembly between the open position and the closed position; and
a resetting knob assembly to interface with and move the stopper and permit the clapper assembly to move from the stopped position to the closed position, the resetting knob assembly including a rod having a first end and a second end with a knob affixed to the second end, the rod being disposed in the aperture and supported by the body with the first end in the passage and the knob external to the body, wherein in the stopped position, the knob is translatable from a first position to a second position, wherein in the first position, the first end of the rod is axially spaced from the stopper and wherein in the second position, the first end of the rod interfaces and moves the stopper, permitting the clapper assembly to move from the stopped position to the closed position, and wherein the stopper includes:
- a first end portion with a bore having a pin to form the second pivot;
- a second end portion at a fixed radial distance from the pin for engagement with the clapper assembly in the stopped position; and
- a central portion between the first end portion and the second end portion, wherein in the second position of the knob, the first end of the rod interfaces the central portion of the stopper.

31. The dry pipe valve of claim 30, wherein in the first position of the knob, the central portion has a first planar surface in contact with the aperture and extends parallel to the common plane, the stopper including a second planar surface extending between and contiguous with each of the second end portion and the first planar surface, the second planar surface being obtuse with respect to the first planar surface.

32. The dry pipe valve of claim 30, wherein the first configuration of the first seating surface and the second configuration of the second seating surface are of different geometric configurations.

33. The dry pipe valve of claim 30, wherein the knob is gravity-biased into the first position.

34. The dry pipe valve of claim 30, wherein the resetting knob assembly includes a wear component inserted and supported in the aperture, the wear component including at least one seal member disposed and supported in the aperture, and wherein, in the first and second position of the knob, the at least one seal member is adjacent and interfaced with the rod, and wherein the at least one seal member interfaces with the rod to prevent leakage past the resetting knob assembly with the knob in the first position, the rod including a plurality of rod portions between the first end and the second end including at least one sealing portion defining a first diameter and at least one necked down portion defining a second diameter smaller than the first diameter, wherein in the first position of the knob, the at least one seal member is adjacent and interfaced with the at least one sealing portion, and wherein in the second position of the knob, the at least one sealing member is adjacent and out of contact with the at least one necked down portion.

35. The dry pipe valve of claim 30, wherein the first configuration comprises a circular configuration centered about the first seat axis and the second configuration comprises a rounded-rectangular configuration centered about the second seat axis, and wherein the rounded-rectangular configuration defines a major width and a minor width, the body further includes a first wall lateral to the minor width and a second wall lateral to the major width, the first and second walls being spaced equidistantly from a perimeter of the clapper assembly.

36. The dry pipe valve of claim 30, wherein the clapper assembly has an assembly length and the access port comprises a rounded-sector perimeter defining a chord length greater than the assembly length of the clapper assembly, the chord length being disposed at an oblique angle from the common plane of the seat, and wherein the rounded-sector perimeter has two linear portions with one of the two linear portions aligned with the clapper assembly in the closed position.

* * * * *